US012767755B2

(12) United States Patent
Rule et al.

(10) Patent No.: US 12,767,755 B2
(45) Date of Patent: Oct. 20, 2026

(54) POLYURETHANES, POLISHING ARTICLES AND POLISHING SYSTEMS THEREFROM AND METHOD OF USE THEREOF

(71) Applicant: 3M INNOVATIVE PROPERTIES COMPANY, St. Paul, MN (US)

(72) Inventors: Joseph D. Rule, Woodbury, MN (US); Jaimie E Stomberg, Minneapolis, MN (US); Duy K. Lehuu, Lake Elmo, MN (US); Jay M. Jennen, Forest Lake, MN (US); David P. Siglin, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 390 days.

(21) Appl. No.: 18/564,215

(22) PCT Filed: May 27, 2022

(86) PCT No.: PCT/IB2022/054983

§ 371 (c)(1),
(2) Date: Nov. 27, 2023

(87) PCT Pub. No.: WO2022/249135

PCT Pub. Date: Dec. 1, 2022

(65) Prior Publication Data

US 2024/0254273 A1 Aug. 1, 2024

Related U.S. Application Data

(60) Provisional application No. 63/194,579, filed on May 28, 2021.

(51) Int. Cl.

| | |
|---|---|
| ***C08G 18/38*** | (2006.01) |
| ***B24B 37/24*** | (2012.01) |
| ***C09G 1/00*** | (2006.01) |

(52) U.S. Cl.
CPC .......... *C08G 18/3851* (2013.01); *B24B 37/24* (2013.01); *C09G 1/00* (2013.01)

(58) Field of Classification Search
CPC ................................................ C08G 18/3851
See application file for complete search history.

(56) References Cited

U.S. PATENT DOCUMENTS

| | | | |
|---|---|---|---|
| 5,152,917 | A | 10/1992 | Pieper et al. |
| 5,435,816 | A | 7/1995 | Spurgeon et al. |

(Continued)

FOREIGN PATENT DOCUMENTS

| | | | |
|---|---|---|---|
| CN | 101134871 | B | 11/2010 |
| JP | 61275351 | A | 12/1986 |

(Continued)

OTHER PUBLICATIONS

"Coatings That Stay Looking Good", BASF Performance Additives, BASF The Chemical Company, 2021, pp. 1-32.

(Continued)

*Primary Examiner* — Michael L Leonard
(74) *Attorney, Agent, or Firm* — Jonathan L. Tolstedt

(57) ABSTRACT

The present disclosure relates to polyurethanes comprising a reaction product of a reactive mixture including a polyol having a number average molecular weight of at least 400 Daltons, a diol chain extender having a molecular weight less than 400 Daltons, a diisocyanate; and a multifunctional amine. The present disclosure further provides polishing layers and polishing pads fabricated therefrom. Additionally, the present disclosure provides polishing systems and polishing methods employing said polishing layers and polishing pads.

15 Claims, 1 Drawing Sheet

(56) References Cited

U.S. PATENT DOCUMENTS

| | | | | |
|---|---|---|---|---|
| 6,285,001 | B1 | 9/2001 | Fleming et al. | |
| 6,372,323 | B1 | 4/2002 | Kobe et al. | |
| 6,376,584 | B1 * | 4/2002 | Galbo | C07D 211/94 546/244 |
| 6,852,766 | B1 | 2/2005 | Devoe | |
| 7,091,255 | B2 | 8/2006 | Devoe | |
| 10,071,461 | B2 | 9/2018 | Lehuu et al. | |
| 10,252,396 | B2 | 4/2019 | Lehuu et al. | |
| 10,590,303 | B2 | 3/2020 | Ho et al. | |
| 2008/0034670 | A1 | 2/2008 | Li et al. | |
| 2008/0230743 | A1 * | 9/2008 | Mita | C07D 401/14 252/182.29 |
| 2010/0188751 | A1 | 7/2010 | Clarke et al. | |
| 2012/0077418 | A1 | 3/2012 | Loyack et al. | |
| 2017/0173758 | A1 | 6/2017 | Lehuu et al. | |
| 2019/0232460 | A1 * | 8/2019 | Takegoshi | B24B 37/24 |
| 2020/0002461 | A1 | 1/2020 | Koide et al. | |
| 2020/0277517 | A1 | 9/2020 | Ho et al. | |
| 2021/0129284 | A1 * | 5/2021 | Yun | B24B 37/24 |

FOREIGN PATENT DOCUMENTS

| | | | |
|---|---|---|---|
| JP | H11137096 | A | 5/1999 |
| JP | 2001303369 | A | 10/2001 |
| JP | 2009505397 | A | 2/2009 |
| WO | 2018207670 | A1 | 11/2018 |
| WO | 2022091069 | A1 | 5/2022 |

OTHER PUBLICATIONS

International Search Report for PCT International Application No. PCT/IB2022/054983, mailed on Sep. 16, 2022, 4 pages.

Kong, "Separation and Identification of an Oligomeric Light Stabilizer Chimassorb 944 by Gradient Elution Chromatography Coupled With Matrix-Assisted Laser Desorption/Ionization Mass Spectrometry", Journal of Chromatography A, 2014, vol. 1364, pp. 198-203.

* cited by examiner

POLYURETHANES, POLISHING ARTICLES AND POLISHING SYSTEMS THEREFROM AND METHOD OF USE THEREOF

CROSS REFERENCE TO RELATED APPLICATIONS

This application is a national stage filing under 35 U.S.C. 371 of PCT/IB2022/054983, filed May 27, 2022, which claims the benefit of U.S. Provisional Application No. 63/194,579, filed May 28, 2021, the disclosures of which are incorporated by reference in their entireties herein.

FIELD OF THE DISCLOSURE

The present disclosure relates to polyurethane materials and articles containing such materials.

BACKGROUND

Polyurethane synthesis and film fabrication are described in, for example, U. S. Pat. Publ. 202010277517 and U.S. Pat. No. 10,590,303. Use of polyurethane films in polishing articles is described in, for example, U.S. Pat. Nos. 10,071, 461 and 10,252,396.

BRIEF DESCRIPTION OF THE FIGURES

The disclosure may be more completely understood in consideration of the following detailed description of various embodiments of the disclosure in connection with the accompanying figures, in which.

DETAILED DESCRIPTION

Figure 1:
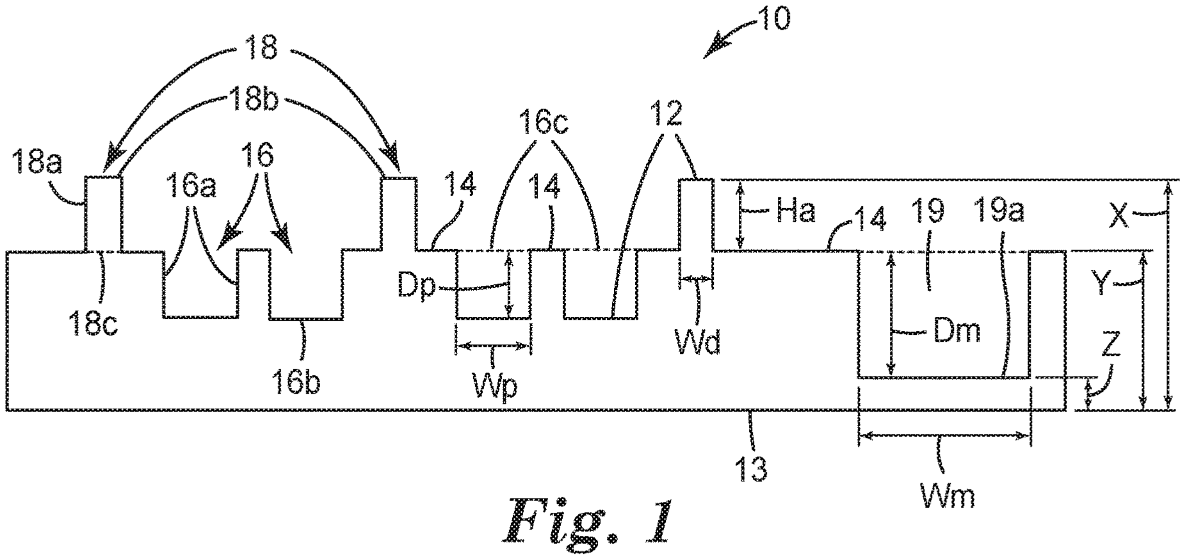
FIG. 1 is a schematic cross-sectional diagram of a portion of a polishing layer in accordance with some embodiments of the present disclosure.

Polyurethanes are versatile resins that are, generally, synthesized from mixtures of polyols, i.e. an organic compound having at least two alcohol functional groups, and polyisocyanates. i.e. an organic compound having at least two isocyanate functional groups. In addition to these components, other compounds may be added during synthesis including chain extenders, chain termination agents, crosslinkers, catalysts and the like. Both thermoplastic and thermoset polyurethanes are readily synthesized and, due to the large breadth in the compounds that may be used for their synthesis, a wide range of material properties may be achieved. Due to their toughness, abrasion resistance and chemical resistance, polyurethanes are often used as protective coatings and films.

One area where polyurethane films have recently been employed is as abrasive materials for various polishing applications, for example, Chemical Mechanical Planarization (CMP) polishing applications. In a typical CMP application, a surface of a substrate, e.g. a semiconductor wafer, is brought into contact with a surface of a polishing pad, often in the presence of a working liquid. The substrate is moved relative to the pad under a designated force or pressure, causing removal of material from the substrate surface. The polishing pad often has multiple layers including a polishing layer, i.e. the layer of the pad that contacts the substrate, and a subpad. The design of the polishing layer is critical to the polishing performance. Some polishing layers may include a working surface (the surface of the polishing layer that contacts the substrate being polished) having specific polishing features, e.g. asperities and/or pores, that facilitate the polishing process. The height of the asperities and/or depth of the pores are critical parameters relative to the pad's polishing performance. In the case of asperities, it is generally desired to have the height of the tallest asperities to be uniform, creating a planar surface of asperity tips. This allows the substrate surface to make uniform contact across the set of asperities. Additionally, the overall thickness of the polishing layer is also a critical parameter relative to the polishing performance. Generally, it is desired to have the polishing layer be of a uniform thickness to allow the polishing layer working surface to be planar. Thickness variations may cause non-planarity of the polishing layer surface and affect the polishing performance, as the substrate may make contact with thicker regions of the polishing layer but may not make contact with thinner regions spanning the region therebetween. Additionally, non-uniform thickness may lead to non-uniform polishing pressure across the substrate surface, which may also adversely affect polishing results, e.g. low or non-uniform substrate removal rates. The dimensional uniformity of the polishing layer thickness and/or polishing features is critical to the polish process. The required dimensional uniformity may create demanding tolerance requirements, as the polishing layer is often in a film format having a thickness of less than 1000 microns and the corresponding polishing features may have dimensions, including height and/or depth, of between 20 to 100 microns.

In addition to these dimensional requirements, the working fluids, e.g. polishing solutions, used in a polishing process may be corrosive, e.g. acidic or basic, and or highly oxidizing, thus the polishing layer should provide good chemical resistance. It is also desired for the polishing layer to last a length of time that meets the polishing life requirements of a given polishing process, i.e. the polishing layer should provide good abrasion resistance. From a manufacturing perspective, an efficient, low cost manufacturing process for the polishing layer is desired, to enable sufficient economic benefit for the pad producer. This process may need to provide uniform polishing layer thickness and it may also need to provide an efficient means for creating the desired polishing features at the desired tolerances on the working surface of the polishing layer.

One approach to creating the polishing features on the working surface of the polishing layer is through the use of a molding or embossing process. In this approach, a polishing layer may be prepared from a thermoplastic that is melt processed, via an extruder for example, and cast onto an embossing roll that includes the negative image of the desired polishing layer features (if the features are on the scale of about 500 microns or less in size, e.g. height, this process may be called a microreplication process). The thermoplastic is then cooled on the embossing roll to cause solidification followed by removal of the thermoplastic film with embossed features from the roll. With respect to melt processing, the thermoplastic may be synthesized, pelletized and then processed into film, at a later time. However, greater efficiency can be achieved by making the thermoplastic in-situ, in an extruder through reactive extrusion. The polyurethane produced can then be formed into a film. In either case, stable fluid flow is required during the casting/embossing process to insure uniform film thickness and uniform feature sizes. Stable fluid flow during melt processing may correlate to stable melt viscosity of the thermoplastic at the melt process temperature, for example. Polyurethanes that are useful as the polishing layer of CMP pads may require high temperatures to form a melt, for example temperatures between 180° C. and 250° C. Variations in viscosity or other properties of the urethane melt in this temperature range can lead to unacceptable coating defects. In addition, low viscosity of the polyurethane melt in this temperature range can lead to low pressures during the fabrication process, e.g. a casting/embossing microreplication process, that may lead to poor replication performance. Therefore, urethane materials with high melt viscosity between 180° C. and 250° C. may be preferred.

In addition to the above characteristics, the zeta potential of the polyurethanes of the present disclosure may be a critical parameter, with respect to specific applications/uses. For example, the zeta potential of a polyurethane used as the polishing layer of a CMP pad may influence the polishing behavior exhibited by the pad. Thus, the capability to modify the zeta potential of the polyurethane may facilitate improved polishing performance. The zeta potential may be modified by blending compounds, typically lower molecular weight compounds, having various functional groups into the polyurethane. However, these compounds may be prone to migration and/or diffusion within the polyurethane and may not stay uniformly dispersed throughout the polyurethane. Additionally, these compounds may be prone to extraction from the polyurethane. For example, during use as a polish layer of a CMP pad, the polyurethanes may contact aqueous and/or non-aqueous polishing solutions that may be capable of extracting components from the polyurethane, particularly at the surface region of the polyurethane polishing layer. The components may then diffuse into the polishing solutions, i.e. be removed from the polyurethane polishing layer, rendering them ineffective as zeta potential modifiers. Thus, there is a need to modify the zeta potential of the polyurethane in a more permanent fashion.

The current disclosure provides a means of modifying the zeta potential of polyurethanes by covalently bonding zeta potential modifying compounds directly into the backbone of the polyurethanes as they are being polymerized. The present disclosure provides multifunctional amines that are capable of reacting into the polyurethane backbone while modifying the zeta potential of the polyurethanes. Typically, these compounds increase the zeta potential of the polyurethane and may provide a polyurethane with a positive zeta potential. As the multifunctional amines are, generally, uniformly dispersed throughout the polyurethane and permanently included in the backbone due to covalent bonding, the zeta potential of the polyurethane is modified in a more stable fashion and maintains a consistent value during use. As the polyurethane wears during use, for example during use as a polishing layer in a CMP application, fresh polyurethane will be exposed having a zeta potential equivalent to the surface that has been eroded away. This behavior contrasts the behavior of materials that are incapable of reacting into a polyurethane during synthesis and/or are blended into a polyurethane, as these materials may diffuse and phase separate within the polyurethane, bloom to the surface of the polyurethane and/or be extracted from the polyurethane during use.

Unless otherwise indicated, all numbers expressing feature sizes, amounts, and physical properties used in the specification and claims are to be understood as being modified in all instances by the term "about." Accordingly, unless indicated to the contrary, the numbers set forth are approximations that can vary depending upon the desired properties using the teachings disclosed herein.

The terms "a", "an", and "the" are used interchangeably with "at least one" to mean one or more of the elements being described.

The term "substituted" (in reference to an alkyl group or moiety) means that at least one carbon bonded hydrogen atom is replaced by one or more non-hydrogen atoms. Examples of substituents or functional groups that can be substituted, include, but are not limited to, alcohol, primary amine and secondary amine.

The terms "aliphatic" and "cycloaliphatic" as used herein refer to compounds with hydrocarbon groups that are alkanes, alkenes or alkynes. The hydrocarbons may include substitution.

The term "alkyl" refers to a monovalent group that is a radical of an alkane. The alkyl can be linear, branched, cyclic, or combinations thereof. The alkyl may contain from 1 to 20 carbon atoms, i.e. a C1-C20 alkyl.

The term "alkylene" refers to a divalent group that is a radical of an alkane. The alkylene can be straight-chained, branched, cyclic, or combinations thereof. The alkylene may contain from 1 to 16 carbon atoms, i.e. a C1-C16 alkylene. In some embodiments, the alkylene contains 1 to 14, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "alkenyl" as used herein refers to straight and branched chain and cyclic alkyl groups as defined herein, except that at least one double bond exists between two carbon atoms. Thus, alkenyl groups may have from 2 to 40 carbon atoms, 2 to about 20 carbon atoms, 2 to about 16 carbon atoms. 2 to 12 carbon atoms or, in some embodiments, from 2 to 8 carbon atoms. Examples include, but are not limited to vinyl, $-CH{=}CH(CH_3)$, $-CH{=}C(CH_3)_2$, $-C(CH_3){=}CH_2$, $-C(CH_3){=}CH(CH_3)$, $-C(CH_2CH_3){=}CH_2$, cyclohexenyl, cyclopentenyl, cyclohexadienyl, butadienyl, pentadienyl, and hexadienyl among others.

The term "acyl" as used herein refers to a group containing a carbonyl moiety wherein the group is bonded via the carbonyl carbon atom. The carbonyl carbon atom is bonded to a hydrogen forming a "formyl" group or is bonded to another carbon atom, which can be part of an alkyl, aryl, aralkyl cycloalkyl, heterocyclyl, heterocyclylalkyl, heteroaryl, heteroarylalkyl group or the like. An acyl group can include 0 to about 8, 0 to about 12, 0 to about 16, 0 to about 20, or 0 to about 40 additional carbon atoms bonded to the carbonyl group. An acyl group can include double or triple bonds within the meaning herein. An acryloyl group is an example of an acyl group. An acyl group can also include heteroatoms within the meaning herein. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group. When the carbonyl of the acyl group is bonded to a halogen, e.g. chlorine, fluorine and/or bromine, the acyl group is termed an "acyl halide", When two acyl groups, both of which are bonded to a halogen, are contained in a compound, the compound is termed a "diacyl halide".

The term "cycloalkyl" as used herein refers to cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined herein. Representative substituted cycloalkyl groups can be mono-substituted or substituted more than once, such as, but not limited to, 2,2-, 2,3-, 2,4-2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

The term "aryl" as used herein refers to cyclic aromatic hydrocarbon groups that do not contain heteroatoms in the ring. Thus, aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, a phenyl group substituted at any one or more of 2-, 3-, 4-, 5-, or 6-positions of the phenyl ring, or a naphthyl group substituted at any one or more of 2- to 8-positions thereof.

The term "aralkyl" as used herein refers to alkyl groups as defined herein in which a hydrogen or carbon bond of an alkyl group is replaced with a bond to an aryl group as defined herein. Representative aralkyl groups include benzyl and phenylethyl groups and fused (cycloalkylaryl)alkyl groups such as 4-ethyl-indanyl. Aralkenyl groups are alkenyl groups as defined herein in which a hydrogen or carbon bond of an alkyl group is replaced with a bond to an aryl group as defined herein.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include about 1 to 8, 1 to about 12, 1 to about 16, about 1 to about 20, or about 1 to about 40 carbon atoms bonded to the oxygen atom, and can further include double or triple bonds, and can also include heteroatoms. For example, an allyloxy group or a methoxyethoxy group is also an alkoxy group within the meaning herein, as is a methylenedioxy group in a context where two adjacent atoms of a structure are substituted therewith.

The term "aromatic" as used herein refers to compounds with hydrocarbon groups that are aryl or arylene groups.

The term "non-aromatic" as used herein refers to compounds that do not include aryl or arylene groups.

Throughout this disclosure the term "alcohol" and "hydroxyl" are used interchangeably.

The term "Working surface" refers to the surface of a polishing pad that will be adjacent to and in at least partial contact with the surface of the substrate being polished.

"Pore" refers to a cavity in the working surface of a pad that allows a fluid, e.g. a liquid, to be contained therein. The pore enables at least some fluid to be contained within the pore and not flow out of the pore.

The term "Precisely shaped" refers to a topographical feature, e.g. an asperity or pore, having a molded shape that is the inverse shape of a corresponding mold cavity or mold protrusion, said shape being retained after the topographical feature is removed from the mold. A pore formed through a foaming process or removal of a soluble material (e.g. a water soluble particle) from a polymer matrix, is not a precisely shaped pore.

"Micro-replication" refers to a fabrication technique wherein precisely shaped topographical features are prepared by casting or molding a polymer (or polymer precursor that is later cured to form a polymer) in a production tool, e.g. a mold or embossing tool, wherein the production tool has a plurality of micron sized to millimeter sized topographical features. Upon removing the polymer from the production tool, a series of topographical features are present in the surface of the polymer. The topographical features of the polymer surface have the inverse shape as the features of the original production tool. The micro-replication fabrication techniques disclosed herein inherently result in the formation of a micro-replicated layer, i.e. a polishing layer, which includes micro-replicated asperities, i.e. precisely shaped asperities, when the production tool has cavities, and micro-replicated pores, i.e. precisely shaped pores, when the production tool has protrusions. If the production tool includes cavities and protrusions, the micro-replicated layer (polishing layer) will have both micro-replicated asperities, i.e. precisely shaped asperities, and micro-replicated pores, i.e. precisely shaped pores. disclosure is directed towards polyurethanes, e.g. thermoplastic polyurethanes. In some embodiments, the present disclosure is directed to a polyurethane comprising a reaction product of a reactive mixture including a polyol having a number average molecular weight of at least 400 Daltons, a diol chain extender having a molecular weight of less than 400 Daltons, a diisocyanate and a multifunctional amine according to at least one of Formula I and Formula II, having the following structures:

Formlua I

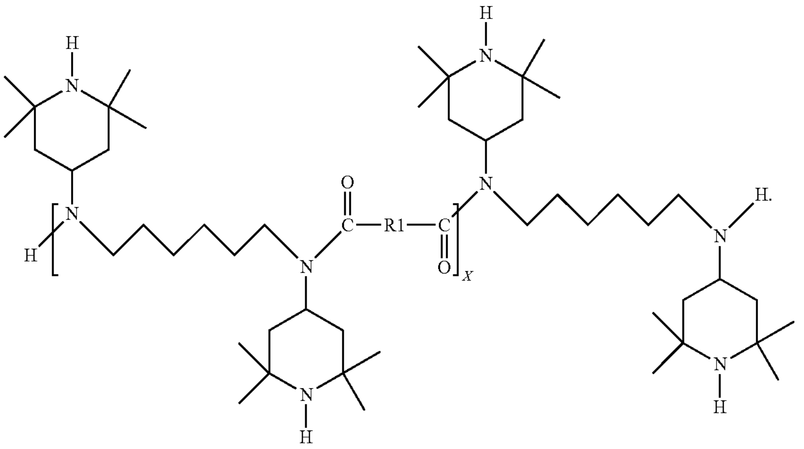

Formula II

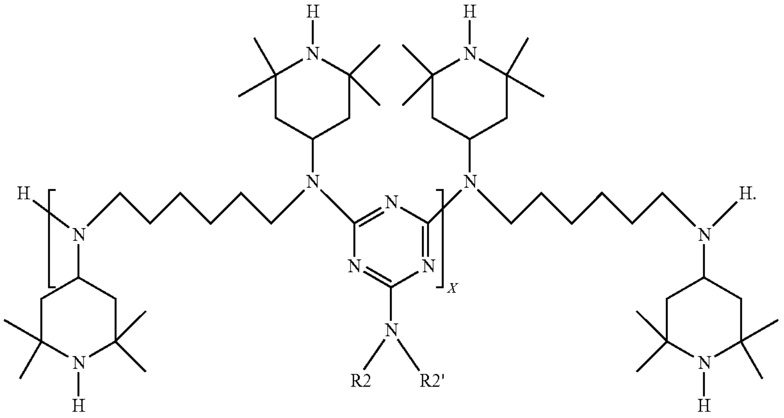

In some embodiments, X is an integer from 0 to 10, inclusive of the endpoints, R1 is a linear or branched aliphatic group, cyclic aliphatic group, aromatic group or a compound containing an aromatic group having from 2 to 20 carbon atoms, R2 is a linear or branched alkyl group having from 1 to 20 carbon atoms and R2' is hydrogen or a linear or branched alkyl group having from 1 to 20 carbon atoms. In some embodiments, X may be an integer from 0 to 5, from 0 to 3, from 1 to 10, from 1 to 5 or from 1 to 3, inclusive of the endpoints. In some embodiments, R1 is a linear or branched aliphatic group, cyclic aliphatic group, aromatic group or a compound containing an aromatic group having from 2 to 16 carbon atoms, from 2 to 12 carbon atoms or from 2 to 8 carbon atoms. In some embodiments, R2 is a linear or branched alkyl group having from 1 to 16 carbon atoms, from 1 to 12 carbon atoms, from 1 to 10 carbon atoms or from 1 to 8 carbon atoms and/or R2' is a hydrogen or a linear or branched alkyl group having from 1 to 16 carbon atoms, from 1 to 12 carbon atoms, from 1 to 10 carbon atoms or from 1 to 8 carbon atoms. In some embodiments, R2 is a linear or branched alkyl group having from 1 to 10 carbon atoms and R2' is a hydrogen. Mixtures of Formula I and Formula II may be used.

The multifunctional amines of Formulas I and Formula II each have two notable features. One feature is that each multifunctional amine contains two unhindered secondary amines (excluding the pendent amine with R2 substitution of the triazine), i.e. the two carbon atoms in a position alpha to the nitrogen of the unhindered secondary amine are not tertiary carbon atoms, or equivalently, the two carbon atoms in a position alpha to the nitrogen contain at least one bond to a hydrogen atom. The unhindered secondary amine functional groups are subsequently capable of reacting with other components of the reactive mixture. The second feature is that each multifunctional amine includes at least two hindered secondary amines, i.e. the two carbon atoms in a position alpha to the nitrogen of the hindered secondary amine are tertiary carbon atoms, or equivalently, the two carbon atoms in a position alpha to the nitrogen include no bonds to a hydrogen atom. Due to the their steric hinderance, the hindered secondary amines are typical incapable of reacting with other components of the reactive mixture or the reaction rate is significantly reduced such that they do not play a significant role in forming the polyurethanes of the present disclosure. The number of hindered secondary amines in the multifunctional amines of Formula I and Formula II depends on the value of X. Thus, the number of hindered amines, N, in the multifunctional amines of Formula I and Formula II may vary according to the following: N=2X+2. In some embodiments, the number of hindered secondary amines in the multifunctional amines of Formula I and Formula II may be from 2 to 22, from 2 to 16, from 2 to 12 or from 2 to 8.

During the polymerization of the polyurethanes, the presence of the two unhindered secondary amines of the multifunctional amines of Formula's I and II enable the compounds to react with the diisocyanate groups of the reaction mixture (covalent bond forming a urea linkage) and to be incorporated into the polyurethanes of the present disclosure, i.e. the multifunctional amines of Formula's I and II become part of the polyurethane backbone. This feature prevents migration and/or diffusion of the multifunctional amines and the compounds may, generally, be uniformly dispersed throughout the polyurethane. This feature also prevents extraction of the multifunctional amines from the polyurethanes during, for example, use as a polishing layer of a CMP pad. During use as a polish layer of a CMP pad, the polyurethanes may contact aqueous and/or non-aqueous polishing solutions that may be capable of extracting components, e.g. lower molecular weight compounds, from the polyurethane, particularly at the surface region of the polyurethane polishing layer. The components may then diffuse into the polishing solutions, i.e. be removed from the polyurethane polishing layer, rendering them ineffective. Due to their covalent bonding into the polyurethane backbone, the multifunctional amines are incapable of being extracted/removed from the polyurethanes of the present disclosure. This behavior contrasts the behavior of multifunctional amines that are incapable of reacting into the polyurethane during synthesis and/or are simply blended into a polyurethane.

As the multifunctional amines are reacted into the polyurethanes of the present disclosure, they may need to be included in the calculation of the stoichiometry of the reactive mixture used to form the polyurethanes. Typically, the stoichiometry of the reactive mixture is calculated based on the ratio of the isocyanate functional groups, associated with the diisocyanate of the reactive mixture, to the hydroxyl functional groups, associated with the polyols and diol chain extender of the reactive mixture. With the inclusion of the multifunctional amine to the reactive mixture, the stoichiometry may be calculated based on the ratio of the isocyanate functional groups, associated with the diisocyanate of the reactive mixture, to the hydroxyl functional groups and unhindered secondary amine functional groups, associated with the polyol, diol chain extender and the multifunctional amine of the reactive mixture. In some embodiments, the mole ratio of isocyanate groups to hydroxyl groups and unhindered secondary amine groups, combined, in the reactive mixture is between 0.96 to 1.08, between 0.97 and 1.06 or between, 0.98 to 1.04. In some embodiments, the amount of multifunctional amine in the reactive mixture is greater than 2 percent by wt., greater than 4 percent by wt., greater than 6 percent by wt. or even greater than 8 percent by wt., based on the total weight of the reactive mixture. In some embodiments, the amount of multifunctional amine in the reactive mixture is greater than 2 percent by wt. and less than 15 percent by wt., greater than 3 percent by wt. and less than 15 percent by wt., greater than 4 percent by wt. and less than 15 percent by wt., greater than 4 percent by wt. and less than 12.5 percent by wt. or greater than 6 percent by wt. and less than 10 percent by wt., based on the total weight of the reactive mixture.

The multifunctional amines contain hindered secondary amines and the hindered secondary amines provide an important attribute; they enable the modification of the zeta potential of the polyurethanes of the present disclosure. Typically, polyurethanes will have a zeta potential that is negative over the entire pH range from 2 to 10. Inclusion of the multifunctional amines with their hindered secondary amines into the polyurethane enables the formation of a polyurethane with a higher zeta potential or even a positive zeta potential at acidic pH. Additionally, the zeta potential of the polyurethanes of the present disclosure may be modified or "tuned" based on the amount of multifunctional amine added to the reactive mixture, i.e. covalently bonded into the polyurethane. Generally, the greater the amount of the multifunctional amine incorporated into the polyurethane, the more positive the zeta potential of the polyurethane. The structure of the sterically hindered amines can affect the pH range over which the zeta potential is positive. Sterically hindered amines with a more basic character can adopt a positive zeta potential at higher pH values compared to amines with less basicity. Although not to be bound by theory, the pH range at which the zeta potential becomes positive generally relates to the pKb of the hindered amines. In some embodiments, the pKb of the hindered amine is less than or equal to 6, less than or equal to 5.5, less than or equal to 5.0 or less than or equal to 4.5 and/or greater than or equal to 2.0, greater than or equal to 2.5 or greater than or equal to 3.0. In general, 2,2,6,6-tetramethylpiperidinyl groups with secondary amines are more basic and more preferred than 1,2,2,6,6-pentamethylpiperidinyl groups and similar structures with tertiary amines. The zeta potential of the polyurethane can affect its performance characteristics in certain applications, for example, when the polyurethane is used as a polishing layer in a CMP application. During CMP applications, the polishing layer will typically be in contact with a polishing solution that is a slurry, i.e. contain abrasive particles. The abrasive particles themselves may have a zeta potential that is negative. Although not wishing to be bound by theory, it is thought that polyurethanes that have a negative zeta potential may repel slurry particles that also have a negative zeta potential. This may adversely affect polishing performance by, for example, decreasing the removal rate or increasing the non-uniformity of the removal rate. However, if the polishing pad has a positive zeta potential, this may attract slurry particles having a negative zeta potential to the polishing layer surface and may provide one or more benefits, e.g. increased removal rates.

The multifunctional amines may be prepared by the reaction of N,N'-(bis-2,2,6,6-tetramethylpiperidin-4-yl) hexane-1.6-diamine and at least one of (i) a dihalogenated, alkyl modified 1,3,5-triazin-2-amine, (ii) a diacid and (iii) a diacyl halide. The dihalogenated, alkyl modified 1,3,5-triazin-2-amine may include at least one of chloro, bromo and fluoro substitution. Examples of suitable dihalogented, alkyl modified 1,3,5-triazin-2-amines include 4,6-dichloro-N-octyl-1,3,5-triazin-2-amine, 4,6-dichloro-N,N-dimethyl-1,3,5-triazin-2-amine, 4,6-dichloro-N,N-dipropyl-1,3,5-triazin-2-amine, 4,6-dichloro-N,N-dihexyl-1,3,5-triazin-2-amine, 4,6-dichloro-N-(1,1,3,3-tetramethylbutyl)-1,3,5-triazin-2-amine and the like. Combinations of dihalogented, alkyl modified 1,3,5-triazin-2-amines may be used. An exemplary multifunctional amine that may be prepared from the reaction of N,N'-(bis-2,2,6,6-tetramethylpiperidin-4-yl) hexane-1.6-diamine and a dihalogenated, alkyl modified 1,3,5-triazin-2-amine is Poly[[6-[(1,1,3,3-tetramethylbutyl) amino]-1,3,5-triazin-2,4-iyl][(2,2,6,6-tetramethyl-4-piperidinyl)imino]-1,6-hexanediyl[(2,2,6,6-tetramethyl-4-piperidinyl)imino]]), available under the trade designation CHIMASSORB 944 from, BASF, Florham Park, New Jersey. Examples of suitable diacids include terephthalic acid (e.g., 1,4 terephthalic acid), 1,4 naphthalic acid, isophthalic acid, phthalic acid, 2,6-naphthalenedicarboxylic acid, diphenyldicarboxylic acid, succinic acid, adipic acid, azelaic acid, maleic acid, glutaric acid, suberic acid, sebacic acid, dodecanedioic acid, 1,4-cyclohexanedicarboxylic acid, and the like. Combinations of diacids may be used. Examples of suitable diacyl halides include bromine, chlorine or fluorine substituted diacids, including bromine, chlorine or fluorine substituted diacids of the present disclosure, e.g. 1,4-terephthaloyl dichloride, 1,4-terephthaloyl difluoride, isophthaloyl difluoride, 1,6-hexanedioyl dichloride, 1,4-proanedioyl dibromide and the like. Combinations of diacyl halides may be used.

The reactive mixture includes a polyol having a number average molecular weight of at least 400 Daltons. The polyol of the reactive mixture can include any suitable number of hydroxyl groups and includes at least two hydroxyl groups. For example, the polyol can include at least six hydroxyl groups, at least four hydroxyl groups, at least three hydroxyl groups or at least two hydroxyl groups. In some embodiments, the polyol has a number average molecular weight between 400 Da and 10,000 Da, between 400 Da and 5,000 Da, between 400 Da and 2,000 Da, between 450 Da and 10,000 Da, between 450 Da and 5,000 Da, between 450 Da and 2,000 Da between 500 Da and 10,000 Da, between 500 Da and 5,000 Da or between 500 Da and 2,000 Da. The type of polyol is not particularly limited. Combinations of different types of polyols may be used. In some embodiments, the polyol may be at least one of a polyester polyol, a polyether polyol, a polycarbonate polyol and a hydroxyl terminated butadiene.

In some embodiments, the polyol may be a polyester polyol. The polyester polyol may be a product of a condensation reaction such as a polycondensation reaction. In embodiments where polyester polyol is made according to a condensation reaction, the reaction can be between one or more carboxylic acids and one or more diols. An example of a suitable carboxylic acid includes a carboxylic acid according to Formula III, having the structure:

Formula III

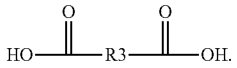

In Formula III, R3 may be chosen from substituted or unsubstituted C1-C40 alkylene, C2-C40 alkylene, C2-C40 alkenylene, C4-C20 arylene, C4-C20 cycloalkylene and C4-C20 aralkylene. Specific examples of suitable carboxylic acids include, but are not limited to, glycolic acid (2-hydroxyethanoic acid), lactic acid (2-hydroxypropanoic acid), succinic acid (butanedioic acid), 3-hydoxybutanoic acid, 3-hydroxypentanoic acid, terepthalic acid (benzene-1,4-dicarboxylic acid), naphthalene dicarboxylic acid, 4-hydroxybenzoic acid, 6-hydroxynaphtalane-2-carboxylic acid, oxalic acid, malonic acid (propanedioic acid), adipic acid (hexanedioic acid), pimelic acid (heptanedioic acid), ethonic acid, suberic acid (octanedioic acid), azelaic acid (nonanedioic acid), sebacic acid (decanedioic acid), glutaric acid (pentanedioic acid), dedecandioic acid, brassylic acid, thapsic acid, maleic acid ((2Z)-but-2-enedioic acid), fumaric acid ((2E)-but-2-enedioic acid), glutaconic acid (pent-2-enedioic acid), 2-decenedioic acid, traumatic acid ((2E)-dodec-2-enedioic acid), muconic acid ((2E,4E)-hexa-2,4-dienedioic acid), glutinic acid, citraconic acid((2Z)-2-methylbut-2-enedioic acid), mesaconic acid ((2E)-2-methyl-2-butenedioic acid), itaconic acid (2-methylidenebutanedioic acid), malic acid (2-hydroxybutanedioic acid), aspartic acid (2-aminobutanedioic acid), glutamic acid (2-aminopentanedioic acid), tartonic acid, tartaric acid (2,3-dihydroxybutanedioic acid), diaminopimelic acid ((2R,6S)-2,6-diaminoheptanedioic acid), saccharic acid ((2S,3S,4S,5R)-2,3,4,5-tetrahydroxyhexanedioic acid), mexooxalic acid, oxaloacetic acid (oxobutanedioic acid), acetonedicarboxylic acid (3-oxopentanedioic acid), arbinaric acid, phthalic acid (benzene-1,2-dicarboxylic acid), isophthalic acid, diphenic acid, 2,6-naphtalenedicarboxylic acid, or a mixture thereof.

An example of a suitable diol for the condensation reaction includes a diol according to Formula IV, having the structure:

Formula IV

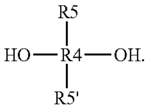

In Formula IV, R4 may be chosen from substituted or unsubstituted C1-C40 alkylene, C2-C40 alkenylene, C4-C20 arylene, C1-C40 acylene, C4-C20 cycloalkylene, C4-C20 aralkylene, and C1-C40 alkoxyene, and R5 and R5' are independently chosen from —H, substituted or unsubstituted C1-C40 alkyl, C2-C40 alkenyl, C4-C20 aryl, C1-C20 acyl, C4-C20 cycloalkyl, C4-C20 aralkyl, and C1-C40 alkoxy. Suitable polyols include, but are not limited to ethylene glycol, 1,2-propanediol, 1,3-propanediol, 1,3-butanediol, 1,4-butanediol, 1,5-pentane-diol, 1,6-hexanediol, 2,2-dimethyl-1,3-propanediol, 1,4-cyclohexanedimethanol, deca-methylene glycol, dodecamethylene glycol, glycerol, trimethylolpropane, and mixtures thereof.

In some embodiments, the polyol is made via a ring opening polymerization, e.g. the ring opening polymerization of ε-caprolactone.

Suitable polyester polyols include, but are not limited to, polybutylene adipate, polyethylene adipate, poly(diethylene glycol adipate), polyhexamethylene adipate, poly(neopentyl glycol) adipate, poly(butylene adipate-co-phthalate), polycaprolactone or copolymers thereof. Combinations of different polyester polyols may be used.

In some embodiments, the polyol of the reactive mixture may be a polyether polyol, including but not limited to, polyoxyalkylene polyols, polyoxycycloalkylene polyols, and alkylene oxide adducts thereof. In some embodiments, the polyether-polyols may be at least one of polyoxyethylene polyol (e.g. polyethylene glycol), polyoxypropylene polyol (e.g. polypropylene glycol), polyoxytetramethylene polyol (e.g. polyoxytetramethylene glycol), copolymers thereof and mixtures thereof and may have a hydroxyl functionality of from 2 to 6, in particular from 2 to 4.

Polyether polyols are well known and may be prepared by reactions of compounds containing hydroxyl groups with, for example, ethylene oxide, propylene oxide, tetramethylene oxide in the presence of a base catalyst, yielding polyoxyethylene polyol, polyoxypropylene polyol and polyoxytetramethylene, respectively. Copolymers containing at least two of ethylene oxide, propylene oxide and tetramethylene oxide may also be used. A variety of hydroxyl group containing compounds can be used to initiate the reaction including, for example, ethylene glycol, propylene glycol, butylene glycol, glycerine, 2,2-dimethylolpropane, pentaerythritol and the like. Examples of commercially available polyether polyols include Arcol polyether polyols available under the trade designation PPG 425, PPG 725, LHT 112 and LHT 240, (from Arco Chemical Co., Newtown Square, PA); polyethylene glycols such as those available under the trade designation Carbowax Sentry provided (Dow Chemical Co., Midland, MI); PLURACOL E 1450 polyethylene glycol (BASF Corp., Parsippany, NJ); and TERATHANE poly(tetramethylene oxide) polyol (E.I. DuPont de Nemours; Wilmington, DE).

In some embodiments, the polyol of the reactive mixture may be a polycarbonate polyol. The polycarbonate polyol can be obtained from the reaction of aliphatic diols, such as 1,4-butanediol and 1,6-hexanediol, with phosgene, diarylcarbonates such as diphenylcarbonate or with cyclic carbonates such as ethylene or propylene carbonate. The aliphatic diol may be any one of or combinations of the diols discussed with respect to Formula N. Examples of commercially available polycarbonate polyols include ARAMACO PERFORMANCE MATERIALS CONVERGE POLYO 212-10, 212-20, CPX-2001-112, CPX-2502-56a and HMA-2 available from Aramaco Performance Materials, LLC, Houston, TX.

In some embodiments, the polyol of the reactive mixture may be a hydroxyl terminated butadiene. The hydroxyl terminated butadiene may be a hydroxyl terminated polybutadiene and the polybutadiene may be a homopolymer or copolymer. Examples of commercially available hydroxyl terminated butadienes include "LIQUIFLEX H" from Petroflex, Wilmington, DE, and POLY-BD-45HTLO from Cray Valley USA, LLC, Exton, PA.

The polyol may be present in the reaction mixture in an amount between 30 wt. % to 80 wt. % based on the weight of the reactive mixture. In some embodiments the amount of polyol present in the reactive mixture is greater than or equal to 30 wt. %, 35 wt. %, 40 wt. %. 45 wt. %, 50 wt. % and/or less than or equal to 80 wt. %, 75 wt. %, 70 wt. %, 65 wt. % or 60 wt. % based on the weight of the reactive mixture. The polyester polyol may include at least 70% by wt. of a polyester diol, based on the total wt. of the polyester polyol in the reactive mixture. In some embodiment the polyester polyol includes at least 70 wt. %, at least 75 wt. %, at least 80 wt. %, at least 85 wt. %, at least 90 wt. %, at least 95 wt. %, at least 97 wt. %, at least 99 wt. % or 100 wt. % of a polyester diol, based on the weight of the polyester polyol in the reactive mixture.

The reactive mixture includes a diol chain extender. The diol chain extender may be described by Formula IV, where R4 is chosen from substituted or unsubstituted C1-C16 alkylene, C2-C16 alkenylene, C4-C20 arylene, C1-C16 acylene, C4-C16 cycloalkylene, C4-C16 aralkylene, and C1-C16 alkoxyene, and R5 and R5' are independently chosen from —H, substituted or unsubstituted C1-C16 alkyl, C2-C16 alkenyl, C4-C16 aryl, C1-C16 acyl, C4-C16 cycloalkyl, C4-C16 aralkyl, and C1-C16 alkoxy and R5 and R5' are prohibited from being hydroxyl and from having hydroxyl substitution. Suitable diols include, but are not limited to, ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, diethylene glycol, hydroquinone bis(2-hydroxyethyl) ether, and dodecamethylene glycol. In some embodiments, the diol chain extender includes at least one of a C1-C16 aliphatic diol and C4-C16 cycloaliphatic diol. In some embodiments, the C1-C16 aliphatic diol includes a C1-C16 alkylene and, optionally, the C1-C16 alkylene is a linear, C2-C16 alkylene with hydroxyl substitution at the two terminal carbon atoms. The diol chain extender can be in a range of from about 1 wt. % to about 15 wt. % of the reaction mixture or from about 2 wt. % to about 15 wt. % of the reactive mixture. In some embodiments, the amount of diol chain extender present in the reactive mixture is greater than or equal to 1 wt. %, 2 wt. %, 3 wt. %, 4 wt. %, 5 wt. %, 6 wt. % and/or less than or equal to 15 wt. %, 14 wt. %, 13 wt. %, 12 wt. % or less than 11 wt. % based on the weight of the reactive mixture. In some embodiments, the diol chain extender has molecular weight of less than 400 Daltons, less than 350 Daltons or less than 300 Daltons. For example, the molecular weight of the diol chain extender can be in a range of from 30 Daltons to less than 400 Daltons, from 30 Daltons to 350 Daltons, 30 Daltons to 300 Daltons or 50 Daltons to less than 400 Daltons. In some embodiments, the molecular weight of the diol chain extender may be the number average molecular weight.

The reactive mixture includes a diisocyanate. The diisocyanate is not particularly limited and can be monomeric, oligomeric or polymeric. An example of a suitable diisocyanate includes a diisocyanate according to Formula V having the structure:

Formula V $$O{=}C{=}N{-}R6{-}N{=}C{=}O.$$

In Formula V, R6 is chosen from substituted or unsubstituted $C_1$-$C_{40}$ alkylene, $C_2$-$C_{40}$ alkenylene, $C_4$-$C_{20}$ arylene, $C_4$-$C_{20}$ arylene-$C_1$-$C_{40}$ alkylene-$C_4$-$C_{20}$ arylene, $C_4$-$C_{20}$ cycloalkylene, and $C_4$-$C_{20}$ aralkylene. In some embodiments, the diisocyanate is chosen from dicyclohexylmethane-4,4'-diisocyanate, isophorone diisocyanate, hexamethylene diisocyanate, 1,4-phenylene diisocyanate, 1,3-phenylene diisocyanate, m-xylylene diisocyanate, tolylene-2,4-diisocyanate, tolylene-2,6-diisocyanate, poly (hexamethylene diisocyanate), 1,4-cyclohexylene diisocyanate, 4-chloro-6-methyl-1,3-phenylene diisocyanate, 4,4'-diphenylmethane diisocyanate, 2,4'-diphenylmethane diisocyanate, 1,4-diisocyanatobutane, 1,8-diisocyanatooctane, 2,5-toluene diisocyanate, methylene bis(o-chlorophenyl diisocyanate, (4,4'-diisocyanato-3,3',5,5'-tetraethyl) diphenylmethane, 4,4'-diisocyanato-3,3'-dimethoxybiphenyl (o-dianisidine diisocyanate), 5-chloro-2,4-toluene diisocyanate, 1-chloromethyl-2,4-diisocyanato benzene, tetramethyl-m-xylylene diisocyanate, 1,12-diisocyanatododecane, 2-methyl-1,5-diisocyanatopentane, 2,2,4-trimethylhexyl diisocyanate, or a mixture thereof.

In some embodiments, the diisocyanate may be a chain extended diisocyanate, i.e. the reaction product of a diisocyanate and a dihydroxyl terminated oligomer or polymer, e.g. a dihydroxyl terminated, linear oligomer or polymer. During the reaction, excess diisocyanate is used to ensure that at least 80% by wt., 90% by wt., 95% by wt., 97% by wt. 98% by wt., 99 wt. % by wt. or 99.5 wt. % of the product of the reaction is also a diisocyanate. The dihydroxyl terminated oligomer or polymer is not particularly limited and may include, for example, dihydroxyl terminated, linear polyesters and dihydroxyl terminated, linear polyethers. Polyester polyols, particularly polyester diols previously discussed with respect to the polyester polyols of the present disclosure may be used to form the chain extended diisocyanate. In some embodiments, the polyester polyol of the chain extended diisocyanate may include the reaction product of one or more C2-C12 diol and one or more C2-C12 diacid. In some embodiments, the diisocyanate includes a diphenylmethane diisocyanate, a reaction product of diphenylmethane diisocyanate and a hydroxyl terminated, linear oligomer or polymer, toluene diisocyanate, a reaction product of toluene diisocyanate and a hydroxyl terminated, linear oligomer or polymer and combinations thereof. One exemplary chain extended diisocyanate is an ethylene-co-butylene adipate polyester terminated with 4,4'-diphenylmethane diisocyanate (MIDI) available under the trade designation "RUBINATE 1234", available from Huntsman Corporation, The Woodlands, TX.

In some embodiments, the amount of diisocyanate in the reaction mixture is between 10 wt. % and 60 wt. % based on the weight of the reactive mixture. In some embodiments, the amount of diisocyanate in the reaction mixture is greater than or equal to 10 wt. %, 15 wt. %, 20 wt. %, 25 wt. % and/or less than or equal to 60 wt. %, 55 wt. %, 50 wt. % or 45 wt. % based on the weight of the reactive mixture.

The reactive mixture may further include a catalyst to facilitate reaction between the polyisocyanate and polyol components. Useful catalysts in the polymerization of polyurethanes include aluminum-, bismuth-, tin-, vanadium-, zinc-, mercury-, and zirconium-based catalysts, amine catalysts, and mixtures thereof. Preferred catalysts include tin based catalysts, such as dibutyl tin compounds. In some embodiments, the catalysts include, but are not limited to, dibutyltin diacetate, dibutyltin dilaurate, dibutyltin di acetyl acetonate, dibutyltin dimercaptide, dibutyltin dioctoate, dibutyltin dimalcate, dibutyltin acetonylacetonate, and dibutyltin oxide. Suitable amounts of the catalyst can be from 0.001% to 1%, from 0.001% to 0.5% or from 0.001% to 0.25%. In some embodiments, the amount of catalyst in the reactive mixture may be greater than or equal to 0.001 wt %, 0.002 wt %, 0.005 wt %, 0.01 wt %, 0.02 wt %, 0.05 wt %, 0.07 wt %, 0.1 wt % and/or less than or equal to 1.0 wt. %, 0.7 wt. %, 0.5 wt. % or 0.3 wt. %, based on the weight of the reactive mixture.

In some embodiments, the reaction mixture may contain a polyol having at least three hydroxyl groups and/or a polyisocyanate having at least three corresponding isocyanate groups. In this case, the polyol and or polyisocyante may act as a branching agent. The amount of polyol and/or polyisocynate must be limited, in order to maintain the general thermoplastic characteristics of the resulting polyurethane. However, components of this nature may be used to increase the molecular weight or modify the viscosity characteristic of the polyurethane.

Other additives may be included in the reactive mixture and polyurethanes of the present disclosure, including but not limited to antioxidants, light/UV light stabilizers, dyes, colorants, filler particles, abrasive particles, reinforcing particles or fibers, viscosity modifiers and the like. Additives that are not soluble in the reactive mixture, e.g. filler particles, abrasive particles, and reinforcing particles or fibers, are not included in the calculation of the weight percent of the components of the reactive mixture, i.e., they are not included in the total weight of the reactive mixture which is used as the basis for the wt. percentage of each component of the reactive mixture.

The polyurethanes of the present disclosure may have stable viscosity at the processing conditions, e.g. temperature, pressure and time, used to fabricate articles therefrom. The viscosity of the polyurethanes at 200° C. may be less than 1,000,000 cP, less than 3,000,000 cP, less than 5,000,000 cP, less than 10,000,000 cP or less than 15,000,000 cP and/or greater than 100,000 cP, greater than 75,000 cP, greater than 50,000 cP, greater than 40,000 cP or greater than 35,000 cP.

The polyurethanes of the present disclosure can be used in a variety of applications and are particularly well suited for the formation of thin films. Due to their unique chemical resistance, abrasion resistance, zeta potential and moldability, the polyurethanes of the present disclosure are particularly useful as a polishing layer in, for example, a polishing pad. In one embodiment, the present disclosure provides a polishing pad comprising a polishing layer having a working surface and a second surface opposite the working surface, wherein the polishing layer includes the polyurethane of any one of embodiments of the present disclosure. Optionally, the polishing layer may include at least 90% by weight, at least 95% by weight, at least 99% by weight or 100% by weight of the polyurethane.

In many polishing applications, e. g. CMP applications, it is generally desirable to have the working surface of the polishing layer of a polishing pad include topography, i.e. be non-planar. The topography may be formed by abrading a substantially planar polishing layer surface with the abrading surface of a pad conditioner. The abrasive particles of the pad conditioner remove regions of the polishing layer surface in a, generally, random fashion and subsequently create topography in the polishing layer surface. Another method to produce topography in the working surface of a polishing layer of a polishing pad is through a micro-replication process, e.g. an embossing process. Such a process provides a working surface of the polishing layer that is precisely designed and engineered to have a plurality of reproducible topographical features, including asperities and/or pores. The asperities and pores are designed to have dimensions ranging from millimeters down to microns, with tolerances being as low as 1 micron or less. Due to the precisely engineered asperity topography of the polishing layer, the polishing pads of the present disclosure may be used without a pad conditioning process, eliminating the need for an abrasive pad conditioner and the corresponding conditioning process. Additionally, the precisely engineered pore topography ensures uniform pores size and distribution across the polishing pad working surface, which leads to improved polishing performance and lower polishing solution usage. Due to their stable flow characteristics, the polyurethanes of the present disclosure are particularly well suited for the fabrication of precisely engineered asperity and pore topography in the working surface of a polishing layer and are capable of meeting the demanding tolerances of said designs. Polishing pads and polishing layers which may employ the polyurethanes of the present disclosure are disclosed in, for example, U.S. Pat. No. 10,252,396, which is incorporated herein by reference in its entirety.

A schematic cross-sectional diagram of a portion of a polishing layer 10 according to some embodiments of the present disclosure is shown in FIG. 1. Polishing layer 10, having thickness X, includes working surface 12 and second surface 13 opposite working surface 12. Working surface 12 is a precisely engineered surface having precisely engineered topography. The working surface includes at least one of a plurality of precisely shaped pores, precisely shaped asperities and combinations thereof. Working surface 12 includes a plurality of precisely shaped pores 16 having a depth Dp, sidewalls 16*a* and bases 16*b* and a plurality of precisely shaped asperities 18 having a height Ha, sidewalls 18*a* and distal ends 18*b*, the distal ends having width Wd. The width of the precisely shaped asperities and asperity bases may be the same as the width of their distal ends, Wd. Land region 14 is located in areas between precisely shaped pores 16 and precisely shaped asperities 18 and may be considered part of the working surface. The intersection of a precisely shaped asperity sidewall 18*a* with the surface of land region 14 adjacent thereto defines the location of the bottom of the asperity and defines a set of precisely shaped asperity bases 18*c*. The intersection of a precisely shaped pore sidewall 16*a* with the surface of land region 14 adjacent thereto is considered to be the top of the pore and defines a set of precisely shaped pore openings 16*c*, having a width Wp. As the bases of the precisely shaped asperities and the openings of adjacent precisely shaped pores are determined by the adjacent land region, the asperity bases are substantially coplanar relative to at least one adjacent pore opening. In some embodiment, a plurality of the asperity bases are substantially coplanar relative to at least one adjacent pore opening. A plurality of asperity bases may include at least about 10%, at least about 30%, at least about 50%, at least about 70%, at least about 80%, at least about 90%, at least about 95%, at least about 97%, at least about 99% or even at least about 100% of the total asperity bases of the polishing layer. The land region provides a distinct area of separation between the precisely shaped features, including separation between adjacent precisely shaped asperities and precisely shaped pores, separation between adjacent precisely shaped pores, and/or separation between adjacent precisely shaped asperities. In some embodiments, the working surface includes a land region and at least one of a plurality of precisely shaped pores and a plurality of precisely shaped asperities.

Land region 14 may be substantially planar and have a substantially uniform thickness, Y, although minor curvature and/or thickness variations consistent with the manufacturing process may be present. As the thickness of the land region, Y, must be greater than the depth of the plurality of precisely shaped pores, the land region may be of greater thickness than other abrasive articles known in the art that may have only asperities. In some embodiments of the present disclosure, when both precisely shaped asperities and precisely shaped pores are both present in the polishing layer, the inclusion of a land region allows one to design the areal density of the plurality of precisely shaped asperities independent of the areal density of the plurality precisely shaped pores, providing greater design flexibility. This is in contrast to conventional pads which may include forming a series of intersecting grooves in a, generally, planar pad surface. The intersecting grooves lead to the formation of a textured working surface, with the grooves (regions where material was removed from the surface) defining the upper regions of the working surface (regions where material was not removed from the surface), i.e. regions that would contact the substrate being abraded or polished. In this known approach, the size, placement and number of grooves define the size, placement and number of upper regions of the working surface, i.e. the areal density of the upper regions of working surface are dependent on the areal density of the grooves. The grooves also may run the length of the pad allowing the polishing solution to flow out of the groove, in contrast to a pore that can contain the polishing solution. Particularly, the inclusion of precisely shaped pores, which can hold and retain the polishing solution proximate to the working surface, may provide enhanced polishing solution delivery for demanding applications, e.g. CMP.

Polishing layer 10 may include at least one macro-channel. FIG. 1 shows macro-channel 19 having width Wm, a depth Dm and base 19*a*. A secondary land region having a thickness, Z, is defined by macro-channel base 19*a*. The secondary land region defined by the base of the macro-channel would not be considered part of land region 14, previously described. In some embodiments, one or more secondary pores (not shown) may be included in at least a portion of the base of the at least one macro-channel. The one or more secondary pores have secondary pore openings (not shown), the secondary pore openings being substantially coplanar with base 19*a* of the macro-channel 19. In some embodiments, the base of the at least one macro-channel is substantially free of secondary pores. In some embodiments, the polishing layer includes a plurality of independent or inter-connected macro-channels. The shape of precisely shaped pores 16 is not particularly limited and includes, but is not limited to, cylinders, half spheres, cubes, rectangular prism, triangular prism, hexagonal prism, triangular pyramid, 4, 5 and 6-sided pyramids, truncated pyramids, cones, truncated cones and the like. The lowest point of a precisely shaped pore 16, relative to the pore opening, is considered to be the bottom of the pore. The shape of all the precisely shaped pores 16 may all be the same or combinations may be used. In some embodiments, at least about 10%, at least about 30%, at least about 50%, at least about 70%, at least about 90%, at least about 95%, at least about 97%, at least about 99% or even at least about 100% of the precisely shaped pores are designed to have the same shape and dimensions. Due to the precision fabrication processes used to fabricate the precisely shaped pores, the tolerances are, generally, small. For a plurality of precisely shaped pores designed to have the same pore dimensions, the pore dimensions are uniform. In some embodiments, the standard deviation of at least one distance dimension corresponding to the size of the plurality of precisely shaped pores; e.g. height, width of a pore opening, length, and diameter; is less than about 20%, less than about 15%, less than about 10%, less than about 8%, less than about 6% less than about 4%, less than about 3%, less than about 2%, or even less than about 1% of the average of the distance dimension. The standard deviation can be measured by known statistical techniques. The standard deviation may be calculated from a sample size of at least 5 pores, or even at least 10 pores at least 20 pores. The sample size may be no greater than 200 pores, no greater than 100 pores or even no greater than 50 pores. The sample may be selected randomly from a single region on the polishing layer or from multiple regions of the polishing layer.

The longest dimension of the precisely shaped pore openings 16*c*, e.g. the diameter when the precisely shaped pores 16 are cylindrical in shape, may be less than about 10 mm, less than about 5 mm, less than about 1 mm, less than about 500 microns, less than about 200 microns, less than about 100 microns, less than about 90 microns, less than about 80 microns, less than about 70 microns or even less than about 60 microns. The longest dimension of the precisely shaped pore openings 16*c* may be greater than about 1 micron, greater than about 5 microns, greater than about 10 microns, greater than about 15 microns or even greater than about 20 microns. The cross-sectional area of the precisely shaped pores 16, e.g. a circle when the precisely shaped pores 16 are cylindrical in shape, may be uniform throughout the depth of the pore, or may decrease, if the precisely shaped pore sidewalls 16*a* taper inward from opening to base, or may increase, if the precisely shaped pore sidewalls 16*a* taper outward. The precisely shaped pore openings 16*c* may all have about the same longest dimensions or the longest dimension may vary between precisely shaped pore openings 16*c* or between sets of different precisely shaped pore openings 16*c*, per design. The width, Wp, of the precisely shaped pore openings may be equal to the values give for the longest dimension, described above.

The depth of the plurality of precisely shaped pores, Dp, is not particularly limited. In some embodiments, the depth of the plurality of precisely shaped pores is less than the thickness of the land region adjacent to each precisely shaped pore, i.e. the precisely shaped pores are not through-holes that go through the entire thickness of land region 14. This enables the pores to trap and retain fluid proximate the working surface. Although the depth of the plurality of precisely shaped pores may be limited as indicated above, this does not prevent the inclusion of one or more other through-holes in the pad, e.g. through-holes to provide polishing solution up through the polishing layer to the working surface or a path for airflow through the pad. A through-hole is defined as a hole going through the entire thickness, Y, of the land region 14.

In some embodiments, the polishing layer is free of through-holes. As the pad is often mounted to another substrate, e.g. a sub-pad or platen during use, via an adhesive, e.g. a pressure sensitive adhesive, through-holes may allow the polishing solution to seep through the pad to the pad-adhesive interface. The polishing solution may be corrosive to the adhesive and cause a detrimental loss in the integrity of the bond between the pad and the substrate to which it is attached.

The depth, Dp, of the plurality of precisely shaped pores 16 may be less than about 5 mm, less than about 1 mm, less than about 500 microns, less than about 200 microns, less than about 100 microns, less than about 90 microns, less than about 80 microns, less than about 70 microns or even less than about 60 microns. The depth of the precisely shaped pores 16 may be greater than about 1 micron, greater than about 5 microns, greater than about 10 microns, greater than about 15 microns or even greater than about 20 microns. The depth of the plurality precisely shaped pores may be between about 1 micron and about 5 mm, between about 1 micron and about 1 mm, between about 1 micron and about 500 microns, between about 1 microns and about 200 microns, between about 1 microns and about 100 microns, 5 micron and about 5 mm, between about 5 micron and about 1 mm, between about 5 micron and about 500 microns, between about 5 microns and about 200 microns or even between about 5 microns and about 100 microns The precisely shaped pores 16 may all have the same depth or the depth may vary between precisely shaped pores 16 or between sets of different precisely shaped pores 16.

In some embodiment, the depth of at least about 10%, at least about 30% at least about 50%, at least 70%, at least about 80%, at least about 90%, at least about 95% or even at least about 100% of the plurality precisely shaped pores is between about 1 micron and about 500 microns, between about 1 micron and about 200 microns, between about 1 micron and about 150 microns, between about 1 micron and about 100 micron, between about 1 micron and about 80 microns, between about 1 micron and about 60 microns, between about 5 microns and about 500 microns, between about 5 micron and about 200 microns, between about 5 microns and 150 microns, between about 5 micron and about 100 micron, between about 5 micron and about 80 microns, between about 5 micron and about 60 microns, between about 10 microns and about 200 microns, between about 10 microns and about 150 microns or even between about 10 microns and about 100 microns.

In some embodiments, the depth of at least a portion of, up to and including all, the plurality of precisely shaped pores is less than the depth of at least a portion of the at least one macro-channel. In some embodiments, the depth of at least about 50%, at least about 60%, at least about 70%, at least about 80%, at least about 90%, at least about 95%, at least about 99% or even at least about 100% of the plurality of precisely pores is less than the depth of at least a portion of a macro-channel.

The precisely shaped pores 16 may be uniformly distributed, i.e. have a single areal density, across the surface of polishing layer 10 or may have different areal density across the surface of polishing layer 10. The areal density of the precisely shaped pores 16 may be less than about 1,000,000/mm$^2$, less than about 500,000/mm$^2$, less than about 100,000/mm$^2$, less than about 50,000/mm$^2$, less than about 10,000/mm$^2$, less than about 5,000/mm$^2$, less than about 1,000/mm$^2$, less than about 500/mm$^2$, less than about 100/mm$^2$, less than about 50/mm$^2$, less than about 10/mm$^2$, or even less than about 5/mm$^2$. The areal density of the precisely shaped pores 16 may be greater than about 1/dm$^2$, may be greater than about 10/dm$^2$, greater than about 100/dm$^2$, greater than about 5/cm$^2$, greater than about 10/cm$^2$, greater than about 100% m$^2$, or even greater than about 500% m$^2$.

The ratio of the total cross-sectional area of the precisely shaped pore openings 16*c*, to the projected polishing pad surface area may be greater than about 0.5%, greater than about 1%, greater than about 3% greater than about 5%, greater than about 10%, greater than about 20%, greater than about 30%, greater than about 40% or even greater than about 50%. The ratio of the total cross-sectional area of the precisely shaped pore openings 16*c*, with respect to the projected polishing pad surface area may be less than about 90%, less than about 80%, less than about 70%, less than about 60%, less than about 50% less than about 40%, less than about 30%, less than about 25% or even less than about 20%. The projected polishing pad surface area is the area resulting from projecting the shape of the polishing pad onto a plane. For example, a circular shaped polishing pad having a radius, r, would have a projected surface area of pi times the radius squared, i.e. the area of the projected circle on a plane.

The precisely shaped pores 16 may be arranged randomly across the surface of polishing layer 10 or may be arranged in a pattern, e.g. a repeating pattern, across polishing layer 10. Patterns include, but are not limited to, square arrays, hexagonal arrays and the like. Combination of patterns may be used.

The shape of precisely shaped asperities 18 is not particularly limited and includes, but is not limited to, cylinders, half spheres, cubes, rectangular prism, triangular prism, hexagonal prism, triangular pyramid, 4, 5 and 6-sided pyramids, truncated pyramids, cones, truncated cones and the like. The intersection of a precisely shaped asperity sidewall 18*a* with the land region 14 is considered to be the base of the asperity. The highest point of a precisely shaped asperity 18, as measured from the asperity base 18*c* to a distal end 18*b*, is considered to be the top of the asperity and the distance between the distal end 18*b* and asperity base 18*c* is the height of the asperity. The shape of all the precisely shaped asperities 18 may all be the same or combinations may be used. In some embodiments, at least about 10%, at least about 30%, at least about 50%, at least about 70%, at least about 90%, at least about 95%, at least about 97%, at least about 99% or even at least about 100% of the precisely shaped asperities are designed to have the same shape and dimensions. Due to the precision fabrication processes used to fabricate the precisely shaped asperities, the tolerances are, generally, small. For a plurality of precisely shaped asperities designed to have the same asperity dimensions, the asperity dimensions are uniform. In some embodiments, the standard deviation of at least one distance dimension corresponding to the size of a plurality of precisely shaped asperities, e.g. height, width of a distal end, width at the base, length, and diameter, is less than about 20%, less than about 15%, less than about 10%, less than about 8%, less than about 6% less than about 4%, less than about 3%, less than about 2%, or even less than about 1% of the average of the distance dimension. The standard deviation can be measured by known statistical techniques. The standard deviation may be calculated from a sample size of at least 5 asperities at least 10 asperities or even at least 20 asperities or even more. The sample size may be no greater than 200 asperities, no greater than 100 asperities or even no greater than 50 asperities. The sample may be selected randomly from a single region on the polishing layer or from multiple regions of the polishing layer.

In some embodiments, at least about 50%, at least about 70%, at least about 90%, at least about 95%, at least about 97%, at least about 99% and even at least about 100% of the precisely shaped asperities are solid structures. A solid structure is defined as a structure that contains less than about 10%, less than about 5%, less than about 3%, less than about 2%, less than about 1%, less than about 0.5% or even 0% porosity by volume. Porosity may include open cell or closed cell structures, as would be found for example in a foam, or machined holes purposely fabricated in the asperities by known techniques, such as, punching, drilling, die cutting, laser cutting, water jet cutting and the like. In some embodiments, the precisely shaped asperities are free of machined holes. As a result of the machining process, machined holes may have unwanted material deformation or build-up near the edge of the hole that can cause defects in the surface of the substrates being polished, e.g. semiconductor wafers.

The longest dimension, with respect to the cross-sectional area of the precisely shaped asperities 18, e.g. the diameter when the precisely shaped asperities 18 are cylindrical in shape, may be less than about 10 mm, less than about 5 mm, less than about 1 mm, less than about 500 microns, less than about 200 microns, less than about 100 microns, less than about 90 microns, less than about 80 microns, less than about 70 microns or even less than about 60 microns. The longest dimension of the of the precisely shaped asperities 18 may be greater than about 1 micron, greater than about 5 microns, greater than about 10 microns, greater than about 15 microns or even greater than about 20 microns. The cross-sectional area of the precisely shaped asperities 18, e.g. a circle when the precisely shaped asperities 18 are cylindrical in shape, may be uniform throughout the height of the asperities, or may decrease, if the precisely shaped asperities' sidewalls 18*a* taper inward from the top of the asperity to the base, or may increase, if the precisely shaped asperities' sidewalls 18*a* taper outward from the top of the asperity to the bases. The precisely shaped asperities 18 may all have the same longest dimension or the longest dimension may vary between precisely shaped asperities 18 or between sets of different precisely shaped asperities 18, per design. The width, Wd, of the distal ends of the precisely shaped asperity bases may be equal to the values give for the longest dimension, described above. The width of the precisely shaped asperity bases may be equal to the values give for the longest dimension, described above.

The height of the precisely shaped asperities 18 may be less than about 5 mm, less than about 1 mm, less than about 500 microns, less than about 200 microns, less than about 100 microns, less than about 90 microns, less than about 80 microns, less than about 70 microns or even less than about 60 microns. The height of the precisely shaped asperities 18 may be greater than about 1 micron, greater than about 5 microns, greater than about 10 microns, greater than about 15 microns or even greater than about 20 microns. The precisely shaped asperities 18 may all have the same height or the height may vary between precisely shaped asperities 18 or between sets of different precisely shaped asperities 18. In some embodiments, the polishing layer's working surface includes a first set of precisely shaped asperities and at least one second set of precisely shaped asperities wherein the height of the first set of precisely shaped asperities is greater than the height of the seconds set of precisely shaped asperities. Having multiple sets of a plurality of precisely shaped asperities, each set having different heights, may provide different planes of polishing asperities. This may become particularly beneficial, if the asperity surfaces have been modified to be hydrophilic, and, after some degree of polishing the, first set of asperities are worn down (including removal of the hydrophilic surface), allowing the second set of asperities to make contact with the substrate being polished and provide fresh asperities for polishing. The second set of asperities may also have a hydrophilic surface and enhance polishing performance over the worn first set of asperities. The first set of the plurality of precisely shaped asperities may have a height between 3 microns and 50 microns, between 3 microns and 30 microns, between 3 microns and 20 microns, between 5 microns and 50 microns, between 5 microns and 30 microns, between 5 microns and 20 microns, between 10 microns and 50 microns, between 10 microns and 30 microns, or even between 10 microns and 20 microns greater than the height of the at least one second set of the plurality of precisely shaped asperities.

In some embodiment, in order to facilitate the utility of the polishing solution at the polishing layer-polishing substrate interface, the height of at least about 10%, at least about 30% at least about 50%, at least 70%, at least about 80%, at least about 90%, at least about 95% or even at least about 100% of the plurality precisely shaped asperities is between about 1 micron and about 500 microns, between about 1 micron and about 200 microns, between about 1 micron and about 100 micron, between about 1 micron and about 80 microns, between about 1 micron and about 60 microns, between about 5 microns and about 500 microns, between about 5 micron and about 200 microns, between about 5 microns and about 150 microns, between about 5 micron and about 100 micron, between about 5 micron and about 80 microns, between about 5 micron and about 60 microns, between about 10 microns and about 200 microns, between about 10 microns and about 150 microns or even between about 10 microns and about 100 microns.

The precisely shaped asperities 18 may be uniformly distributed, i.e. have a single areal density, across the surface of the polishing layer 10 or may have different areal density across the surface of the polishing layer 10. The areal density of the precisely shaped asperities 18 may be less than about 1,000,000/mm$^2$, less than about 500,000/mm$^2$, less than about 100,000/mm$^2$, less than about 50,000/mm$^2$, less than about 10,000/mm$^2$, less than about 5,000/mm$^2$, less than about 1,000/mm$^2$, less than about 500/mm$^2$, less than about 100/mm$^2$, less than about 50/mm$^2$, less than about 10/mm$^2$, or even less than about 5/mm$^2$. The areal density of the precisely shaped asperities 18 may be greater than about 1/dm$^2$, may be greater than about 10/dm$^2$, greater than about 100/dm$^2$, greater than about 5/cm$^2$, greater than about 10% m$^2$, greater than about 100% m$^2$, or even greater than about 500% m$^2$. In some embodiments, the areal density of the plurality of precisely shaped asperities is independent of the areal density of the plurality precisely shaped pores.

The precisely shaped asperities 18 may be arranged randomly across the surface of polishing layer 10 or may be arranged in a pattern, e.g. a repeating pattern, across polishing layer 10. Patterns include, but are not limited to, square arrays, hexagonal arrays and the like. Combination of patterns may be used.

The total cross-sectional area of distal ends 18*b* with respect to the total projected polishing pad surface area may be greater than about 0.01%, greater than about 0.05%, greater than about 0.1%, greater than about 0.5%, greater than about 1%, greater than about 3% greater than about 5%, greater than about 10%, greater than about 15%, greater than about 20% or even greater than about 30%. The total cross-sectional area of distal ends 18*b* of precisely shaped asperities 18 with respect to the total projected polishing pad surface area may be less than about 90%, less than about 80%, less than about 70%, less than about 60%, less than about 50% less than about 40%, less than about 30%, less than about 25% or even less than about 20%. The total cross-sectional area of the precisely shaped asperity bases with respect to the total projected polishing pad surface area may be the same as described for the distal ends.

Figure 2:
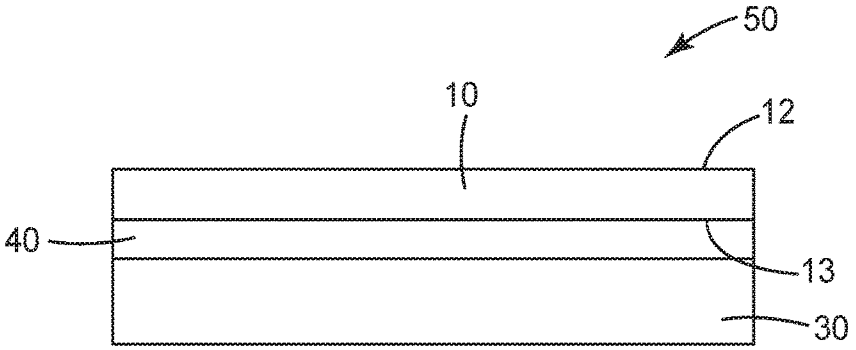
FIG. 2 is a schematic cross-sectional diagram of a polishing pad in accordance with some embodiments of the present disclosure.

The polishing layer, by itself, may function as a polishing pad. The polishing layer may be in the form of a film that is wound on a core and employed in a "roll to roll" format during use. The polishing layer may also be fabricated into individual pads, e.g. a circular shaped pad, as further discussed below. According to some embodiments of the present disclosure, the polishing pad, which includes a polishing layer, may also include a subpad. FIG. 2 shows a polishing pad 50 which includes a polishing layer 10, having a working surface 12 and second surface 13 opposite working surface 12, and a subpad 30 adjacent to second surface 13. Optionally, a foam layer 40 is interposed between the second surface 13 of the polishing layer 10 and the subpad 30. The various layers of the polishing pad can be adhered together by any techniques known in the art, including using adhesives, e.g. pressure sensitive adhesives (PSAs), hot melt adhesives and cure in place adhesives. In some embodiments, the polishing pad includes an adhesive layer adjacent to the second surface. Use of a lamination process in conjunction with PSAs, e.g. PSA transfer tapes, is one particular process for adhering the various layers of polishing pad 50. Subpad 30 may be any of those known in the art. Subpad 30 may be a single layer of a relatively stiff material, e.g. polycarbonate, or a single layer of a relatively compressible material, e.g. an elastomeric foam. The subpad 30 may also have two or more layers and may include a substantially rigid layer (e.g. a stiff material or high modulus material like polycarbonate, polyester and the like) and a substantially compressible layer (e.g. an elastomer or an elastomeric foam material). Foam layer 40 may have a durometer from between about 20 Shore D to about 90 Shore D. Foam layer 40 may have a thickness from between about 125 micron and about 5 mm or even between about 125 micron and about a 1000 micron.

In some embodiments of the present disclosure, which include a subpad having one or more opaque layers, a small hole may be cut into the subpad creating a "window". The hole may be cut through the entire subpad or only through the one or more opaque layers. The cut portion of the supbad or one or more opaque layers is removed from the subpad, allowing light to be transmitted through this region. The hole is pre-positioned to align with the endpoint window of the polishing tool platen and facilitates the use of the wafer endpoint detection system of the polishing tool, by enabling light from the tool's endpoint detection system to travel through the polishing pad and contact the wafer. Light based endpoint polishing detection systems are known in the art and can be found, for example, on MIRRA and REFLEXION LK CMP polishing tools available from Applied Materials, Inc., Santa Clara, California. Polishing pads of the present disclosure can be fabricated to run on such tools and endpoint detection windows which are configured to function with the polishing tool's endpoint detection system can be included in the pad. In one embodiment, a polishing pad including any one of the polishing layers of the present disclosure can be laminated to a subpad. The subpad includes at least one stiff layer, e.g. polycarbonate, and at least one compliant layer, e.g. an elastomeric foam, the elastic modulus of the stiff layer being greater than the elastic modulus of the compliant layer. The compliant layer may be opaque and prevent light transmission required for endpoint detection. The stiff layer of the subpad is laminated to the second surface of the polishing layer, typically through the use of a PSA, e.g. transfer adhesive or tape. Prior to or after lamination, a hole may be die cut, for example, by a standard kiss cutting method or cut by hand, in the opaque compliant layer of the subpad. The cut region of the compliant layer is removed creating a "window" in the polishing pad. If adhesive residue is present in the hole opening, it can be removed, for example, through the use of an appropriate solvent and/or wiping with a cloth or the like. The "window" in the polishing pad is configured such that, when the polishing pad is mounted to the polishing tool platen, the window of the polishing pad aligns with the endpoint detection window of the polishing tool platen. The dimensions of the hole may be, for example, up to 5 cm wide by 20 cm long. The dimensions of the hole are, generally, the same or similar in dimensions as the dimensions of the endpoint detection window of the platen.

The polishing pad thickness is not particularly limited. The polishing pad thickness may coincide with the required thickness to enable polishing on the appropriate polishing tool. The polishing pad thickness may be greater than about 25 microns, greater than about 50 microns, greater than about 100 microns or even greater than 250 microns; less than about 20 mm, less than about 10 mm, less than about 5 mm or even less than about 2.5 mm. The shape of the polishing pad is not particularly limited. The pads may be fabricated such that the pad shape coincides with the shape of the corresponding platen of the polishing tool the pad will be attached to during use. Pad shapes, such as circular, square, hexagonal and the like may be used. A maximum dimension of the pad, e.g. the diameter for a circular shaped pad, is not particularly limited. The maximum dimension of a pad may be greater than about 10 cm, greater than about 20 cm, greater than about 30 cm, greater than about 40 cm, greater than about 50 cm, greater than about 60 cm; less than about 2.0 meter, less than about 1.5 meter or even less than about 1.0 meter. As disused above, the pad, including the polishing layer, the subpad, the optional foam layer and any combination thereof, may include a window, i.e. a region allowing light to pass through, to enable standard endpoint detection techniques used in polishing processes, e.g. wafer endpoint detection.

In some embodiments, the polishing layer may be a unitary sheet. A unitary sheet includes only a single layer of material (i.e. it is not a multi-layer construction, e.g. a laminate) and the single layer of material has a single composition. The composition may include multiple-components, e.g. a polymer blend or a polymer-inorganic composite. Use of a unitary sheet as the polishing layer may provide cost benefits, due to minimization of the number of process steps required to form the polishing layer. A polishing layer that includes a unitary sheet may be fabricated from techniques know in the art, including, but not limited to, molding and embossing. Due to the ability to form a polishing layer having precisely shaped, asperities and/or precisely shaped pores and, optionally, macro-channels in a single step, a unitary sheet is preferred.

The hardness and flexibility of polishing layer 10 is predominately controlled by the polyurethane used to fabricate it. The hardness of polishing layer 10 is not particularly limited. The hardness of polishing layer 10 may be greater than about 20 Shore D, greater than about 30 Shore D or even greater than about 40 Shore D. The hardness of polishing layer 10 may be less than about 90 Shore D, less than about 80 Shore D or even less than about 70 Shore D. The hardness of polishing layer 10 may be greater than about 20 Shore A, greater than about 30 Shore A or even greater than about 40 Shore A. The hardness of polishing layer 10 may be less than about 95 Shore A, less than about 80 Shore A or even less than about 70 Shore A. The polishing layer may be flexible. In some embodiments the polishing layer is capable of being bent back upon itself producing a radius of curvature in the bend region of less than about 10 cm, less than about 5 cm, less than about 3 cm, or even less than about 1 cm; and greater than about 0.1 mm, greater than about, 0.5 mm or even greater than about 1 mm. In some embodiments the polishing layer is capable of being bent back upon itself producing a radius of curvature in the bend region of between about 10 cm and about 0.1 mm, between about 5 cm and bout 0.5 mm or even between about 3 cm and about 1 mm.

To improve the useful life of polishing layer 10, it is desirable to utilize polyurethane having a high degree of toughness. This is particularly important, due to the fact the precisely shaped asperities are small in height yet need to perform for a significantly long time to have a long use life. The use life may be determined by the specific process in which the polishing layer is employed. In some embodiments, the use lifetime is at least about 30 minutes at least 60 minutes, at least 100 minutes, at least 200 minutes, at least 500 minutes or even at least 1000 minutes. The use life may be less than 10000 minutes, less than 5000 minutes or even less than 2000 minutes. The useful life time may be determined by measuring a final parameter with respect to the end use process and/or substrate being polished. For example, use life may be determined by having an average removal rate or having a removal rate consistency (as measure by the standard deviation of the removal rate) of the substrate being polished over a specified time period (as defined above) or producing a consistent surface finish on a substrate over a specified time period. In some embodiments, the polishing layer can provide a standard deviation of the removal rate of a substrate being polished that is between about 0.1% and 20%, between about 0.1% and about 15%, between about 0.1% and about 10%, between about 0.1% and about 5% or even between about 0.1% and about 3% over a time period from of, at least about 30 minutes, at least about 60 minutes, at least about 100 minutes at least about 200 minutes or even at least about 500 minutes. The time period may be less than 10000 minutes. To achieve this, it is desirable to use polymeric materials having a high work to failure (also known as Energy to Break Stress), as demonstrated by having a large integrated area under a stress vs. strain curve, as measured via a typical tensile test, e.g. as outlined by ASTM D638. High work to failure may correlate to lower wear materials. In some embodiments, the work to failure is greater than about 3 Joules, greater than about 5 Joules, greater than about 10 Joules, greater than about 15 Joules greater than about 20 Joules, greater than about 25 Joules or even greater than about 30 Joules. The work to failure may be less than about 100 Joules or even less than about 80 Joules.

The polyurethane used to fabricate polishing layer 10 may be used in substantially pure form. The polyurethane materials used to fabricate polishing layer 10 may include fillers known in the art. In some embodiments, the polishing layer 10 is substantially free of any inorganic abrasive material (e.g. inorganic abrasive particles), i.e. it is an abrasive free polishing pad. By substantially free it is meant that the polishing layer 10 includes less than about 10% by volume, less than about 5% by volume, less than about 3% by volume, less than about 1% by volume or even less than about 0.5% by volume inorganic abrasive particles. In some embodiments, the polishing layer 10 contains substantially no inorganic abrasive particles. An abrasive material may be defined as a material having a Mohs hardness greater than the Mobs hardness of the substrate being abraded or polished. An abrasive material may be defined as having a Mobs hardness greater than about 5.0, greater than about 5.5, greater than about 6.0, greater than about 6.5, greater than about 7.0, greater than about 7.5, greater than about 8.0 or even greater than about 9.0. The maximum Mohs hardness is general accepted to be 10. The polishing layer 10 may be fabricated by any techniques known in the art. Microreplication techniques are disclosed in U.S. Pat. Nos. 6,285,001; 6,372,323; 5,152,917; 5,435,816; 6,852,766; 7,091,255 and U.S. Patent Application Publication No. 2010/0188751, all of which are incorporated by reference in their entirety.

In some embodiments, the polishing layer 10 is formed by the following process. First, a sheet of polycarbonate is laser ablated according to the procedures described in U.S. Pat. No. 6,285,001, forming the positive master tool, i.e. a tool having about the same surface topography as that required for polishing layer 10. The polycarbonate master is then plated with nickel using conventional techniques forming a negative master tool. The nickel negative master tool may then be used in an embossing process, for example, the process described in U.S. Patent Application Publication No. 2010/0188751, to form polishing layer 10. The embossing process may include the extrusion of a polyurethane melt onto the surface of the nickel negative and, with appropriate pressure, the polyurethane melt is forced into the topographical features of the nickel negative. Upon cooling the polyurethane melt, the solid polymer film may be removed from the nickel negative, forming polishing layer 10 with working surface 12 having the desired topographical features, i.e. precisely shaped pores 16 and/or precisely shaped asperities 18 (FIG. 1). If the negative includes the appropriate negative topography that corresponds to a desired pattern of macro-channels, macro-channels may be formed in the polishing layer 10 via the embossing process.

In another embodiment the present disclosure relates to a polishing system, the polishing system includes any one of the previous polishing pads and a polishing solution. The polishing pads may include any of the previous disclosed polishing layers 10. The polishing solutions used are not particularly limited and may be any of those known in the art. The polishing solutions may be aqueous or non-aqueous. An aqueous polishing solution is defined as a polishing solution having a liquid phase (does not include particles, if the polishing solution is a slurry) that is at least 50% by weight water. A non-aqueous solution is defined as a polishing solution having a liquid phase that is less than 50% by weight water. In some embodiments, the polishing solution is a slurry, i.e. a liquid that contains organic or inorganic abrasive particles or combinations thereof. The concentration of organic or inorganic abrasive particles or combination thereof in the polishing solution is not particularly limited. The concentration of organic or inorganic abrasive particles or combinations thereof in the polishing solution may be, greater than about 0.5%, greater than about 1%, greater than about 2%, greater than about 3%, greater than about 4% or even greater than about 5% by weight; may be less than about 30%, less than about 20% less than about 15% or even less than about 10% by weight. In some embodiments, the polishing solution is substantially free of organic or inorganic abrasive particles. By "substantially free of organic or inorganic abrasive particles" it is meant that the polishing solution contains less than about 0.5%, less than about 0.25%, less than about 0.1% or even less than about 0.05% by weight of organic or inorganic abrasive particles. In one embodiment, the polishing solution may contain no organic or inorganic abrasive particles. The polishing system may include polishing solutions, e.g. slurries, used for silicon oxide CMP, including, but not limited to, shallow trench isolation CMP; polishing solutions, e.g. slurries, used for metal CMP, including, but not limited to, tungsten CMP, copper CMP and aluminum CMP; polishing solutions, e.g. slurries, used for barrier CMP, including but not limited to tantalum and tantalum nitride CMP and polishing solutions, e.g. slurries, used for polishing hard substrates, such as, sapphire. The polishing system may further include a substrate to be polished or abraded.

In some embodiments, the polishing pads of the present disclosure may include at least two polishing layers, i.e. a multi-layered arrangement of polishing layers. The polishing layers of a polishing pad having a multi-layered arrangement of polishing layers may include any of the polishing layer embodiments of the present disclosure.

Figure 3:
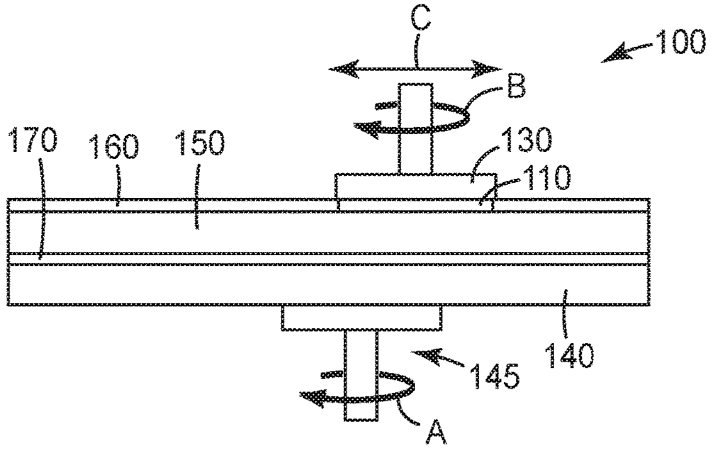
FIG. 3 illustrates a schematic diagram of an example of a polishing system for utilizing the polishing pads and methods in accordance with some embodiments of the present disclosure.

FIG. 3 schematically illustrates an example of a polishing system 100 for utilizing polishing pads and methods in accordance with some embodiments of the present disclosure. As shown, the system 100 may include a polishing pad 150 and a polishing solution 160. The system may further include one or more of the following: a substrate 110 to be polished or abraded, a platen 140 and a carrier assembly 130. An adhesive layer 170 may be used to attach the polishing pad 150 to platen 140 and may be part of the polishing system. Polishing solution 160 may be a layer of solution disposed about a major surface, e.g. working surface, of the polishing pad 150. Polishing pad 150 may be any of the polishing pad embodiments of the present disclosure and includes at least one polishing layer (not shown), as described herein, and may optionally include a subpad and/or foam layer(s), as described for polishing pad 50 and of FIG. 2. The polishing solution is typically disposed on the working surface of the polishing layer of the polishing pad. The polishing solution may also be at the interface between substrate 110 and polishing pad 150. During operation of the polishing system 100, a drive assembly 145 may rotate (arrow A) the platen 140 to move the polishing pad 150 to carry out a polishing operation. The polishing pad 150 and the polishing solution 160 may separately, or in combination, define a polishing environment that mechanically and/or chemically removes material from or polishes a major surface of a substrate 110. To polish the major surface of the substrate 110 with the polishing system 100, the carrier assembly 130 may urge substrate 110 against a polishing surface of the polishing pad 150 in the presence of the polishing solution 160. The platen 140 (and thus the polishing pad 150) and/or the carrier assembly 130 then move relative to one another to translate the substrate 110 across the polishing surface of the polishing pad 150. The carrier assembly 130 may rotate (arrow B) and optionally transverse laterally (arrow C). As a result, the polishing layer of polishing pad 150 removes material from the surface of the substrate 110. In some embodiments, inorganic abrasive material, e.g. inorganic abrasive particles, may be included in the polishing layer to facilitate material removal from the surface of the substrate. In other embodiments, the polishing layer is substantially free of any inorganic abrasive material and the polishing solution may be substantially free of organic or inorganic abrasive particle or may contain organic or inorganic abrasive particles or combination thereof. It is to be appreciated that the polishing system 100 of FIG. 3 is only one example of a polishing system that may be employed in connection with the polishing pads and methods of the present disclosure, and that other conventional polishing systems may be employed without deviating from the scope of the present disclosure.

In another embodiment, the present disclosure relates to a method of polishing a substrate, the method of polishing including: providing a polishing pad according to any one of the previous polishing pads, wherein the polishing pad may include any of the previously described polishing layers; providing a substrate, contacting the working surface of the polishing pad with the substrate surface, moving the polishing pad and the substrate relative to one another while maintaining contact between the working surface of the polishing pad and the substrate surface, wherein polishing is conducted in the presence of a polishing solution. In some embodiments, the polishing solution is a slurry and may include any of the previously discussed slurries. In another embodiment the present disclosure relates to any of the preceding methods of polishing a substrate, wherein the substrate is a semiconductor wafer. The materials comprising the semiconductor wafer surface to be polished, i.e. in contact with the working surface of the polishing pad, may include, but are not limited to, at least one of a dielectric material, an electrically conductive material, a barrier/adhesion material and a cap material. The dielectric material may include at least one of an inorganic dielectric material, e.g. silicone oxide and other glasses, and an organic dielectric material. The metal material may include, but is not limited to, at least one of copper, tungsten, aluminum, silver and the like. The cap material may include, but is not limited to, at least one of silicon carbide and silicon nitride. The barrier/adhesion material may include, but is not limited to, at least one of tantalum and tantalum nitride. The method of polishing may also include a pad conditioning or cleaning step, which may be conducted in-situ, i.e. during polishing. Pad conditioning may use any pad conditioner or brush known in the art, e.g. 3M CMP PAD CONDITIONER BRUSH PB33A, 4.25 in diameter available from the 3M Company, St. Paul, Minnesota. Cleaning may employ a brush, e.g. 3M CMP PAD CONDITIONER BRUSH PB33A, 4.25 in diameter available from the 3M Company, and/or a water or solvent rinse of the polishing pad.

EXAMPLES

Unless otherwise noted or readily apparent from the context, all parts, percentages, ratios, etc. in the Examples and the rest of the specification are by weight.

| Materials Used in the Examples | |
|---|---|
| Abbreviation | Description and Source |
| Fomrez 44-160 | Poly(butylene adipate) polyol with a hydroxy number of 160, available under the trade designation "FOMREZ 44-160", obtained from Lanxess, Cologne, Germany. |
| Fomrez 44-111 | Poly(butylene adipate) polyol with a hydroxy number of 111, available under the trade designation "FOMREZ 44-111", obtained from Lanxess, Cologne, Germany. |
| CAPA 2203A | Polycaprolactone polyol with a hydroxy number of 56, available under the trade designation "CAPA 2203A", obtained from Ingevity, North Charleston, SC. |
| 1,4-BDO | 1,4-butanediol, obtained from BASF Corporation, Ludwigshafen, Germany. |
| DBTDL | Dibutyltin dilaurate, obtained from PMC Organometallix, Inc, Mount Laurel, NJ. |
| Rubinate 1234 | MDI-based, low-functionality, polyester-based prepolymer with 18.9% NCO, available under the trade designation "RUBINATE 1234", obtained from Huntsman Corporation, The Woodlands, TX. |
| Estane 58277 | Aromatic polyester-based thermoplastic polyurethane with a Shore Hardness of 92A, obtained from The Lubrizol Corporation, Wickliffe, OH. |
| Chimassorb 944 | Poly[[6-[(1,1,3,3-tetramethylbutyl)amino]-1,3,5-triazin-2,4-iyl][(2,2,6,6-tetramethyl-4-piperidinyl)imino]-1,6-hexanediyl[(2,2,6,6-tetramethyl-4-piperidinyl)imino]]), with an $M_N$ of 2000-3100 g/mol, obtained from BASF, Ludwigshafen, Germany. |
| Tinuvin 622 | Butanedioic acid, dimethylester, polymer with 4-hydroxy-2,2,6,6-tetramethyl-1-piperidine ethanol, with an $M_N$ of 3100-4000, obtained from BASF, Ludwigshafen, Germany. |
| HPMP | 4-hydroxy-1,2,2,6,6-pentamethylpiperidine obtained from Sigma-Aldrich, St. Louis, MO. |

Test Methods

General Microcomputer Polymerization Method

Thermoplastic polyurethanes were prepared using an MC15 Micro Compounder (obtained from Xplore Instruments, Sittard, The Netherlands). Polyol, chain extender, isocyanate, and amine (per the compositions shown in Tables 1 and 2) were added to the microcompounder with a total charge of 15 mL. The reactive mixture was mixed for ten minutes with a screw speed of 100 RPM and a temperature setting of 210° C. to allow polymerization to occur. The resulting polymer was then pressed into a flat sheet using a hydraulic press at 375° F.

Melt Viscosity Measurement

The melt viscosity was measured using a DHR-2 rheometer (TA Instruments, New Castle, DE). A disk of polymer between 1.0 and 2.0 mm thick having a diameter for 8 mm was dried in a 100° C. oven and stored in a vial with desiccant. The sample was mounted in the rheometer with 8 mm diameter parallel plates. The sample was tested using a shear sweep at 200° C. with shear rates of 0.001, 0.0032, 0.01, 0.032, 0.1, 0.32, 1, 3.2, and 10 1/s. The viscosity measured at 0.1 1/s is reported.

Zeta Potential Measurement

The zeta potential of some microreplicated polishing pad surfaces was measured using a SurPASS 2 ElectroKinetic Analyzer (available from Anton Parr, Graz, Austria). Sample analysis was performed in 0.001 M KCl with measurements from pH 6 to 2 taken first using 0.05 M $HNO_3$ as titrant followed by measurements from pH 6 to 10 using 0.05 M KOH as titrant. The sample size was 10 mm×20 mm with a sample gap of 100+/−20 microns. All measurements were made using nitrogen purge with flow adjusted to 7 psi. Standard Measurement Conditions were as follows:

Measuring Step Parameter Set: set at Z_R300_180_P400_20

Rinse Target Pressure: 300 mbar

Time Limit: 180 sec

Ramp Target Pressure: 400 mbar

Max Ramp Time: 20 sec

Comparative Example 1 (CE-1)

Chimassorb 944 (0.94 g) and Estane 58277 (16.06 g) were added to an MC-15 microcompounder and mixed at a temperature of 210° C. for 10 minutes. The resulting polyurethane melt was then pressed into a film in a hydraulic press at 375° F. (190° C.). The viscosity of this material at 200° C. was measured to be 1,700,000 cP.

Comparative Examples 2 and 3 (CE-2 and CE-3) and Examples 4 to 10 (Ex. 4 to Ex. 101

Comparative Examples 2 to 3 and Examples 4 to 10 were prepared using the General Microcompounder Polymerization Method according to the compositions of Table 2. The isocyanate index and the viscosities of the resulting materials are also displayed in Table 2.

TABLE 1

| Composition of Reactive Mixtures (values in wt. %) | | | | | | |
|---|---|---|---|---|---|---|
| Component | CE-2 | CE-3 | Ex. 4 | Ex. 5 | Ex. 6 | Ex. 7 |
| Fomrez 44-160 | 37.9 | 29.3 | — | — | — | — |
| Fomrez 44-111 | — | — | 34.6 | 34.5 | 34.4 | 34.3 |
| 1,4-Butanediol | 6.0 | 8.3 | 7.5 | 7.3 | 7.2 | 7.0 |

TABLE 1-continued

| Composition of Reactive Mixtures (values in wt. %) | | | | | | |
|---|---|---|---|---|---|---|
| Component | CE-2 | CE-3 | Ex. 4 | Ex. 5 | Ex. 6 | Ex. 7 |
| Rubinate 1234 | 54.8 | 59.3 | 52.4 | 52.7 | 52.9 | 53.2 |
| Chimassorb 944 | — | — | 5.5 | 5.5 | 5.5 | 5.5 |
| Tinuvin 622 | — | 1.3 | — | — | — | — |
| HPMP | 1.3 | — | — | — | — | — |
| Isocyanate Index | 1.00 | 1.00 | 0.98 | 1.00 | 1.02 | 1.04 |
| Viscosity at 200° C. (cP) | 900,000 | 4,100,000 | 5,400,000 | 16,300,000 | 24,500,000 | 31,300,000 |

Reactive Extrusion Method for Examples 8, 9, and 10

Examples 8, 9 and 10 were prepared using conventional reactive extrusion techniques. A twin-screw extruder, Model ZE40A, available from Berstorff Corp., Florence KY, having 7 barrel sections with each barrel having a 43 mm diameter was used to prepare the polyurethanes according to the formulations shown in Table 2. In the discussion that follows, the first barrel was closest to the extruder drive mechanism and seventh barrel was nearest the exit of the extruder. Polyol (either Fomrez 44-160, Fomrez 44-111 or Capa 2203A, per Table 2) were added to the first barrel section via a heated ZENITH B-9000 gear pump, available from Circor International, Inc., Burlington, MA. 1,4-butanediol was added to the first section barrel via a second ZENITH B-9000 gear pump. DBTL was also added to the first barrel section via a PHD Ultra XF MA 1 70-3313 syringe pump, available from Harvard Apparatus, Holliston, MA. Rubinate 1234 was added to the third barrel section via a third ZEITH B-9000 gear pump. Chimassorb 944 was metered into a side stuffer unit via a Ktron loss in weight feeder, available from Coperion, Pittman. NJ. The side stuffer conveyed the Chimassorb 944 into barrel section 4. The molten polyurethane discharged from the extruder into a ZENITH PEP II, 20 $cm^3$/revolution sized gear pump, available from Circor International, Inc. The polyurethane was pumped into an underwater pelletizer, model number EUP10, available from ECON Inc. Monroe, MI. The polyurethanes were prepared at a rate of about 100 lb/hr (45 kg/hr).

TABLE 2

| Composition of Reactive Mixtures (values in wt. %) | | | |
|---|---|---|---|
| Component | Ex. 8 | Ex. 9 | Ex. 10 |
| Fomrez 44-160 | — | — | 34.0 |
| Fomrez 44-111 | 34.4 | — | — |
| CAPA 2203A | — | 38.3 | — |

TABLE 2-continued

| Composition of Reactive Mixtures (values in wt. %) | | | |
|---|---|---|---|
| Component | Ex. 8 | Ex. 9 | Ex. 10 |
| 1,4-Butanediol | 7.2 | 8.3 | 6.5 |
| Rubinate 1234 | 52.9 | 51.1 | 54.1 |
| DBTDL | 0.005 | 0.005 | 0.005 |
| Chimassorb 944 | 5.5 | 2.3 | 5.5 |
| Isocyanate Index | 1.02 | 1.02 | 0.99 |

The pellets of Examples 8, 9 and 10 were used to generate micro-replicated polishing pads using an embossing process; the general procedure disclosed in U.S. Pat. No. 10,252,396, which is incorporated herein by reference in its entirety. In addition, a polishing pad, Comparative Example 11 (CE-11) was prepared using pellets of Estane 58277 resin using the same general procedure. The surface of the polishing pads from Examples 8, 9, and CE-11 were found to have the zeta potential values shown in Table 3.

TABLE 3

| Zeta Potential Results at pH 3, 6, and 9. | | | | | | |
|---|---|---|---|---|---|---|
| | CE-11 | | Ex. 8 | | Ex. 9 | |
| pH | Zeta Potential (mV) | Conductivity (mS/m) | Zeta Potential (mV) | Conductivity (mS/m) | Zeta Potential (mV) | Conductivity (mS/m) |
| 3 | 0.56 | 80.26 | 50.74 | 57.54 | 43.4 | 59.35 |
| 6 | −34.29 | 15.9 | 36.9 | 15.06 | 19.79 | 14.72 |
| 9 | −52.85 | 15.94 | −16.08 | 15.29 | −29.27 | 15.53 |

300 Nm Low K Wafer Polishing Test Method

Wafers were polished using a CMP polisher available under the trade designation REFLEXION polisher from Applied Materials, Inc. of Santa Clara, CA. The polisher was fitted with a 300 mm CONTOUR head for holding 300 mm diameter wafers. A 30.5 inch (77.5 cm) diameter pad prepared from the polyurethane of Example 8 was laminated to the platen of the polishing tool with a layer of PSA. The pad was broken in using a 12 psi, 2 minute retaining ring break-in. CONTOUR head pressures, platen and head RPMs are shown in Table 1. Wafers were polished at 1.5 PSI for 1 minute. A brush type pad conditioner, available under the trade designation 3M CMP PAD CONDITIONER BRUSH PB33A, 4.25 in diameter available from the 3M Company, St. Paul, Minnesota was mounted on the conditioning arm and used at a speed of 108 rpm with a 3 lbf downforce during break-in and polish. The pad conditioner was swept across the surface of the pad via a sinusoidal sweep at 19 swp/min, with 100% in-situ conditioning.

Polishing was also conducted using a standard industry pad, an VP6000 (available from Dow, Midland, MI), Comparative Example 12 (CE-12). CE-12 was broken in using a 6 lbf, 20 minute conditioner break-in. A CVD diamond conditioner, available under the trade designation 3M Trizact B6-1900-5S2 available from the 3M Company, St. Paul, Minnesota was mounted on the conditioning arm and used at a speed of 83 rpm with a 5 lbf downforce during polish. The pad conditioner was swept across the surface of the pad via a sinusoidal sweep at 13 swp/min, with 100% in-situ conditioning.

The polishing solution was a slurry, available under the trade designation BSL8402C from Fujifilm, Tokyo, Japan. Prior to use, the BSL8402C slurry was diluted with 30% hydrogen peroxide such that the final solution had 1.9% hydrogen peroxide. Low k monitor wafers were polished for 1 minute and subsequently measured. 300 mm diameter low k monitor wafers were obtained from Advantiv Technologies Inc., Fremont, California. The wafer stack was as follows: 300 mm Si substrate+PE-CVD SiCOH (BD1) 5KA. Thermal oxide wafers were used as "dummy" wafers between monitor wafer polishing and were polished using the same process conditions as the monitor wafers.

Removal rate was calculated by determining the change in thickness of the oxide layer being polished. This change in thickness was divided by the wafer polishing time to obtain the removal rate for the oxide layer being polished. Thickness measurements for 300 mm diameter wafers were taken with a NovaScan 3090Next 300, available from Nova Measuring Instruments, Rehovot, Israel. Sixty-five-point diameter scans with 2 mm edge exclusion were employed. The average removal rate for two rate wafers polished using the pad prepared from the polyurethane of Example 8 was 2,493 angstroms/min. The average removal rate for two rate wafers polished using CE-12 was 649 angstroms/min.

TABLE 4

CONTOUR head pressures, head and platen RPMs used for break-in and polish tests.

| Condition | Retaining ring (PSI) | Zone 1 (PSI) | Zone 2 (PSI) | Zone 3 (PSI) | Zone 4 (PSI) | Zone 5 (PSI) | Head RPM | Platen RPM |
|---|---|---|---|---|---|---|---|---|
| Break-in | 12 | 0.4 | vacuum | vacuum | vacuum | vacuum | 81 | 80 |
| 1.5 PSI | 3.30 | 4.00 | 1.40 | 1.50 | 1.50 | 1.20 | 84 | 90 |

What is claimed is:

1. A polyurethane comprising a reaction product of a reactive mixture including, a polyol having a number average molecular weight of at least 400 Daltons;

a diol chain extender having a molecular weight less than 400 Daltons;

a diisocyanate; and a multifunctional amine according to at least one of Formula I and Formula II Formlua I

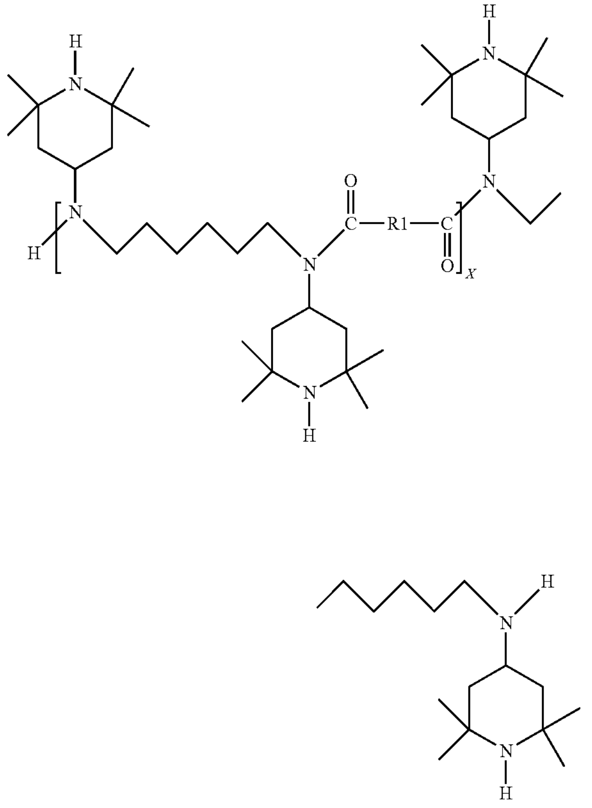

-continued

Formula II

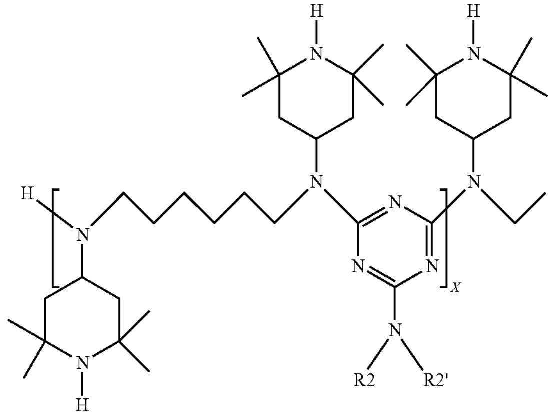

-continued

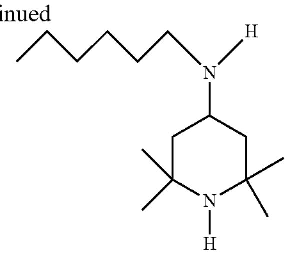

wherein,

X is an integer from 0 to 10, inclusive of the endpoints,

R1 is a linear or branched aliphatic group, cyclic aliphatic group, aromatic group or a compound containing an aromatic group having from 2 to 20 carbon atoms, R2 is a linear or branched alkyl group having from 1 to 20 carbon atoms, and R2' is hydrogen or a linear or branched alkyl group having from 1 to 20 carbon atoms.

2. The polyurethane of claim 1, wherein X is an integer from 0 to 3, inclusive of the endpoints.

3. The polyurethane of claim 1, wherein R1 is a linear aliphatic group having from 2-8 carbon atoms or an aromatic group.

4. The polyurethane of claim 1, wherein R2 is a linear or branched alkyl having from 1 to 10 carbon atoms and R2' is hydrogen.

5. The polyurethane of claim 1, wherein the amount of multifunctional amine in the reactive mixture is greater than 2 percent by wt. and less than 15 percent by wt. based on the total weight of the reactive mixture.

6. The polyurethane of claim 1, wherein the mole ratio of isocyanate groups to hydroxyl groups and unhindered secondary amine groups, combined, in the reactive mixture is between 0.96 to 1.08.

7. The polyurethane of claim 1, wherein the polyol includes at least 70 wt. % of a polyol having a hydroxyl functionality of two, based on the weight of the polyol in the reactive mixture.

8. The polyurethane of claim 1, wherein the polyol is between 30 wt. % to 80 wt. % based on the weight of the reactive mixture.

9. The polyurethane of claim 1, wherein the polyol includes at least one of a polyester polyol, a polyether polyol, a polycarbonate polyol and a hydroxyl terminated butadiene.

10. The polyurethane of claim 1, wherein the diisocyanate is between 10 wt. % to 60 wt. % based on the weight of the reactive mixture.

11. The polyurethane of claim 1, wherein the diisocyanate includes a diphenylmethane diisocyanate, a reaction product of a diphenylmethane diisocyanate and a hydroxyl terminated, linear oligomer or polymer, toluene diisocyanate, a reaction product of toluene diisocyanate and a hydroxyl terminated, linear oligomer or polymer and combinations thereof.

12. The polyurethane of claim 1, wherein the polyurethane is a thermoplastic polyurethane.

13. The polyurethane of claim 1, wherein the reactive mixture further includes a polyol having at least three hydroxyl groups.

14. A polishing pad comprising a polishing layer having a working surface and a second surface opposite the working surface, wherein the polishing layer includes the polyurethane of claim 1.

15. The polishing pad of claim 14, wherein the working surface includes a land region and at least one of a plurality of precisely shaped pores and a plurality of precisely shaped asperities.

* * * * *